(12) United States Patent
Dickins et al.

(10) Patent No.: US 8,574,075 B2
(45) Date of Patent: Nov. 5, 2013

(54) ASYNCHRONOUS AUDIO FOR NETWORKED GAMES

(75) Inventors: Glenn N. Dickins, Sydney (AU); John J. Griffin, San Francisco, CA (US); Aya Itokawa, Kanagawa (JP); Hiroaki Kondo, Tokyo (JP); Lori L. Solomon, Oakland, CA (US); Matthew A. Tullis, Walnut Creek, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 365 days.

(21) Appl. No.: 12/809,450

(22) PCT Filed: Dec. 18, 2008

(86) PCT No.: PCT/US2008/087528
§ 371 (c)(1),
(2), (4) Date: Feb. 15, 2011

(87) PCT Pub. No.: WO2009/086011
PCT Pub. Date: Jul. 9, 2009

(65) Prior Publication Data
US 2011/0165945 A1    Jul. 7, 2011

Related U.S. Application Data

(60) Provisional application No. 61/016,382, filed on Dec. 21, 2007.

(51) Int. Cl.
*A63F 13/12* (2006.01)
*A63F 9/24* (2006.01)

(52) U.S. Cl.
USPC .............................................. 463/35; 463/42

(58) Field of Classification Search
USPC ......................................... 463/35, 40, 41, 42
See application file for complete search history.

(56) References Cited

U.S. PATENT DOCUMENTS

| | | | |
|---|---|---|---|
| 4,445,187 A | 4/1984 | Best | |
| 6,322,451 B1 | 11/2001 | Miura | |
| 2004/0172246 A1 * | 9/2004 | Kendra | 704/246 |
| 2005/0255914 A1 * | 11/2005 | McHale et al. | 463/31 |
| 2009/0054156 A1 | 2/2009 | Mori | |

FOREIGN PATENT DOCUMENTS

| | | |
|---|---|---|
| GB | 2 415 392 | 12/2005 |
| JP | 2000-126455 | 5/2000 |
| JP | 2007-222411 | 9/2007 |
| WO | WO 2006/090202 | 8/2006 |

OTHER PUBLICATIONS

Notification of Transmittal of the International Search Report and Written Opinion, received in international application No. PCT/US2008/087528, dated Aug. 6, 2009, 15 pages.

* cited by examiner

*Primary Examiner* — Damon Pierce

(57) ABSTRACT

In a game, multiple players are communicatively coupled with a network. A progression of game action states is tracked. The action states relate to events that occur during the game and a situation of each of the players that corresponds to the events. Upon reaching a first action state, in which a player is expected to utter a first vociferation based on that player's situation with respect to a game event that occurs in association with the first action state, it is detected whether the vociferation is uttered. The first vociferation is captured. The vociferation may be sent to the other players asynchronously with respect to its capture where it may be rendered locally.

50 Claims, 16 Drawing Sheets

ASYNCHRONOUS AUDIO FOR NETWORKED GAMES

TECHNOLOGY

The present invention relates generally to audio technology. More particularly, embodiments of the present invention relate to asynchronous audio for networked games.

BACKGROUND

Modern computerized and other electronic games may involve significant interaction by multiple players. One or more of a game's players may be physically remote from one or more of the game's other players, even separated over vast geographical distances. Network based communication between each of the players' game platforms may readily maintain the interactive features of the game. Moreover, modern networked gaming may allow interactive participation by substantial numbers of remote players.

Audio effects, including sounds, scripted voice and vocal interaction between and among players, are a feature in some modern network based games.

The approaches described in this section are approaches that could be pursued, but not necessarily approaches that have been previously conceived or pursued. Thus, unless otherwise expressly indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
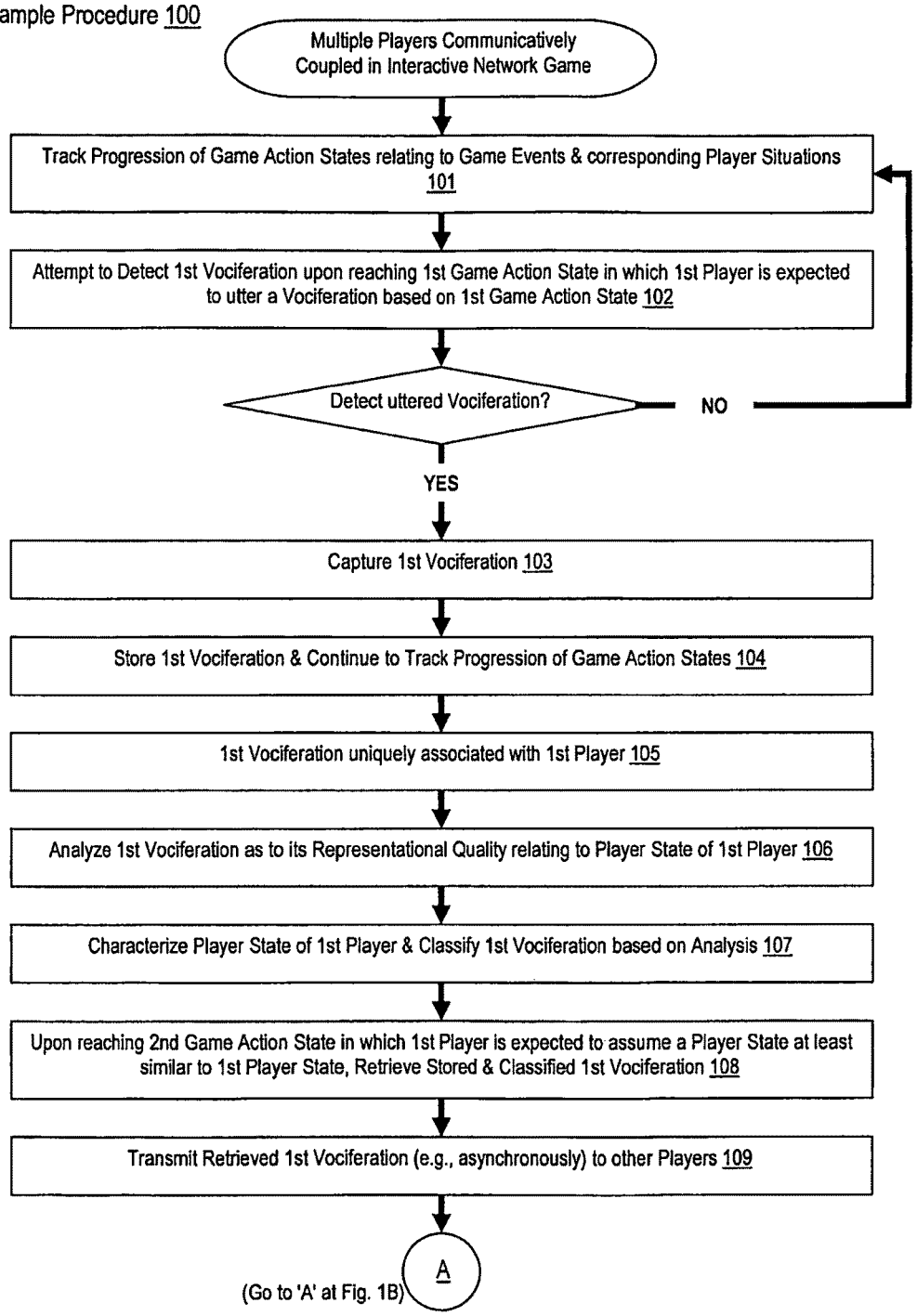
FIG. 1A and FIG. 1B depict a first example procedure, according to an embodiment of the present invention.

Example embodiments that relate to asynchronous audio for networked games are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to asynchronous audio for interactive, multiple user networked games. Embodiments of the present invention support the recreational and entertainment value in network supported game play, which relates to interactive audio. Game entertainment value may relate to sounds uttered or made by players at various points in the progression of a game at which certain game events occur. The term "game state" may refer herein to such points in the game's progression. For instance, in a certain game state, one or more game events may occur in relation to at least one of the multiple game players, and multiple game states may occur during the progression of a game. In response to the occurrence of some game events and/or the existence of some game states, a player whose play, game situation or standing, score or the like is affected therewith may be expected to utter a vociferation that reflects or represents the player's game related state of mind in relation to the event or game state. Vociferation may thus express delight, frustration, triumph, satisfaction, humor, angst, thoughtfulness, and a variety of other player thoughts and emotions. The term "player state" may refer herein to a player's game related state of mind.

A game engine that functions according to an embodiment tracks and maintains an awareness of the game states, game events, participating players, and their player states. An embodiment functions with economical and accessible techniques to record (e.g., detect, capture, and store) a relatively short section of audio (e.g., an audio clip) from a player at a point during the progress of a game at which they may be expected to react to a game event that occurs and/or game state that exists at that point to utter a vociferation. For instance, the expectation for the utterance of a vociferation may be based on a player state predicted to correspond to the player. The captured audio may then be sent, e.g., asynchronously with respect to its capture, over the game supporting network to other relevant players. The audio is delivered to opposing, related, and other players and, when rendered audibly at the other players' locale, may enhance a sense of interaction, fun, enjoyment, and human contact relating to the game play. In some circumstances, such audio based enhancement may encourage game players to develop more elaborate vociferation utterances, such as unique, stylized, dramatized, humorous, emotion-laden and/or entertaining "death cries," "victory shouts," and the like, knowing for instance that they will be heard by the other game players with whom they interact in game play. Thus, vociferations may function as a significant aspect of the game play.

In an embodiment, a game client captures audio content from a player and sends it to other game clients for replay to other players. The capturing and sending client may control, e.g., with commands, when and under what contexts (e.g., game states, game events) other game clients render (e.g., replay) a sound locally. An embodiment may capture the audio content and send it to other game clients with an appropriate characterization. The receiving game clients may cache the sound and independently decide an appropriate time and context for its replay. Moreover, an embodiment may function with a combination of both command control by a capturing and sending client and local independent replay control.

An embodiment of the present invention captures interactive audio content efficiently and economically in relation to computational costs, bandwidth and other network resources using low bit rate audio, asynchronously, and in other than real time or real time and may use relatively simple audio channels. The present embodiment may obviate establishing perpetual audio coding and/or relatively complex, elaborate, computationally or bandwidth intensive real time synchronous audio data channels between game players. However, it should be appreciated that embodiments are also well suited to function with more elaborate audio features, as they may become available.

Interactive audio in networked games may perform a variety of functions, which may include social interaction, strategic or operational coordination, game state intelligence (e.g., which other players are where and what game actions they may be taking), and enhancing fun and enjoyment in the game play. Embodiments may enhance at least the social interaction and enjoyment enhancement functions.

With sufficient computational and network resources available, a game's audio content may also include scripted audio and/or interactive audio. Scripted audio may include preset sound files, which are played and rendered to match the local and global game state of each individual player. Other interactive audio may include live audio feeds from each player. The live audio feeds may be continually fed into the game environment and streamed and rendered at each individual player. Interactive audio may be provided with a central server for processing the interactive audio. Central servers are not however a requirement; interactive audio may also be supported with a collection of networked game devices.

An embodiment of the present invention relates to interactive audio and functions independently of synchronous and continual real time audio feeds. Embodiments may thus economize on the computational resources required for audio compression and rendering, as well as on network bandwidth needed to support the audio data channel. Thus, the present embodiment may be implemented with efficient and economical resources to provide asynchronous audio for network games played with compact portable gaming devices, in which computational and networking resources, as well as power resources (battery charge), may function using a significant portion of their available capacity. Embodiments of the present invention thus effectively obviate conversational, ongoing, streaming or other real time audio over an interactive synchronous audio link (although they are, of course, also well suited to function with such resources, as they may be available).

Embodiments of the present invention function, in a sense, as driven by the state of a game and independent of requirements for players to specifically author or add game sound effects. Embodiments of the present invention function to capture, transmit, and re-use audio from multiple actual players to augment and enhance the game play without requiring any explicit user intervention, and to dynamically and adaptively update the audio sequences available for use.

An embodiment of the present invention uses the game state to estimate the player state from which decisions are made about when to capture and how to reuse or update a vociferation. Captured vociferation sounds are classified and labeled with an estimate or characterization of the player state associated with the utterance of the sound (e.g., angry, excited, frustrated, delighted, etc.), and to keep track of the players to which the uttered vociferation relates. Using game events and estimated player state, along with the appropriate labeling, re-use and updating game audio allows timely capture, transport and replay of actual player vociferations that are relevant to the game play. Game players need not explicitly define audio sections to be captured, nor designate other players with whom to communicate.

Asynchronous audio for networked games is disclosed herein. In an online game, multiple players are communicatively coupled via a network. Action states of the game are tracked as the game progresses. The action states relate to events that occur during the game and a situation of each of the players that corresponds to the events. Upon reaching a first game action state, at least one of the players may be expected to utter a first vociferation based on the players' situation with respect to a game event that occurs in association with the first game action state. If the player utters it as expected, the first vociferation is then detected and captured.

The plurality of players of the game may be communicatively coupled via a network in a real time, near real time, other than real time or non-real time condition. Playing the vociferation and/or transmitting the vociferation to the other players may be performed, at least in part, asynchronously with respect to its capturing step. The first vociferation may be sent to the other players asynchronously with respect to its capture.

Upon its capture, the first vociferation may be uniquely associated with the player from whom it was uttered. A first player state may be characterized, which corresponds to the first vociferation. The first vociferation may be classified based on the characterized first player state and the player with whom it is associated. The classified first vociferation may then be stored and/or transmitted to other relevant game players and the tracking of the game states may continue.

In an embodiment, the first vociferation is sent, e.g., without intentional delay, upon its capture to other relevant players, for essentially real time or near real time playback. Further, a reference, command or the like may be sent, which other local game clients may use to reuse the first vociferation, e.g., to store audio content associated therewith, retrieve the associated audio content and replay the first vociferation, upon a similar game state being reached and/or similar game events occurring. Similar game states may be expected to result in a player state at least similar to the player state corresponding to the utterance of the first vociferation in the player who uttered it. Thus, remote playback at the other game clients may essentially be decoupled from the transmission of one or more of the first vociferation or a reuse reference, command, etc. that may be associated therewith.

Upon reaching a second action state, in which the player is expected to assume a player state that is at least similar to the first player state, based on the situation of the player with respect to at least one game event that occurs in association with the second action state, the stored first vociferation is retrieved. The retrieved first vociferation, or a reference, command or the like that is associated therewith, which other local game clients may use to reuse the first vociferation, e.g., to retrieve and replay stored audio content associated with an instance of the first vociferation sent previously, is transmitted to the other players. The first vociferation may then be rendered (e.g., audibly played back, reproduced, etc.) locally with respect to the other players.

A first representational quality may be analyzed, which corresponds to the first vociferation in relation to the first player state. The characterization of the first player state and/or the classification of the first vociferation may be based, at least partially, on the analysis of the analysis of the first representational quality of the vociferation.

Upon reaching a third action state, in which the player is expected to assume a player state that is at least similar to the first player state, based on the situation of the player with respect to at least one game event that occurs in association with the third action state, the stored first vociferation is retrieved. The retrieved first vociferation (or a reference, command or the like that is associated therewith, which other local game clients may use to reuse the first vociferation, e.g., to retrieve and replay stored audio content associated with an instance of the first vociferation sent previously) is transmitted to the other players. Further upon reaching the third action state, it may be detected that the player utters a second vociferation based on the third action state. Upon detecting that the player does utter a second vociferation based on the third action state, the second vociferation is captured.

A second representational quality is analyzed, which corresponds to the second vociferation in relation to the first player state. The player state corresponding to that player may be re-characterized and/or the second vociferation classified based, at least in part, on the analysis of the second representational quality. The first and the second representational qualities may be compared in relation to the first player state based, at least in part, on the re-characterization of the player's player state and/or the classification of the second vociferation. Based on this comparison, either the first vociferation or the second vociferation may be selected.

The second vociferation, if selected based on the comparison, may be stored and/or transmitted to other relevant game players. Upon storing the second vociferation, a fourth game action state may be reached, which is temporally subsequent to at least the third action state with respect to the progression of the game. In the fourth game action state, the player may be expected, based on the situation of the player with respect to at least one game event that occurs in association with the fourth action state, to assume a player state that is at least similar to the first player state. Upon reaching the fourth game action state, the stored second vociferation, or a reference, command or the like that is associated therewith, which other local game clients may use to reuse the second vociferation, e.g., to retrieve and replay stored audio content associated with an instance of the second vociferation sent previously, may be retrieved and transmitted to the other players. The second vociferation may then be rendered (e.g., audibly played back, reproduced, etc.) locally with respect to the other players. If however, based on the comparison, the first vociferation is selected, then upon reaching the fourth action state, the stored first vociferation is retrieved and transmitted to the other players. The first vociferation may then be rendered (e.g., audibly played back, reproduced, etc.) locally with respect to the other players.

The analysis of the representational quality of the vociferation, in relation to the player state, may include predicting an expected response of the player to one or more events associated with the third action state. The expected response may relate to contextual, emotional, and/or vociferating behavior that corresponds to the player state of the at least one of the players. The predicted expected player response may be dynamically updated based, at least in part, on the detection of the second vociferation and the analysis of the representational quality corresponding thereto.

Capturing a player's vociferation may be performed asynchronously in relation to its transmission to the other players, players' situations with respect to a game event that occurs in association with a game action state, situations of a player with respect to at least a second game event that occurs in association with the first action state, and/or the situations of the player with respect to at least a second game action state. The second game event may be independent, at least temporally, with respect to the first game event. Moreover, the second action state may be independent, at least temporally, with respect to the first action state.

In an embodiment, a computer system performs one or more features described. The computer system includes one or more processors and may function with hardware, software, firmware and/or any combination thereof to execute one or more of the features described. The processor(s) and/or other components of the computer system may function, in executing one or more of the features described, under the direction of computer readable and executable instructions, which may be encoded in one or multiple computer readable storage media and/or received by the computer system.

In an embodiment, one or more of the features described herein execute in a game apparatus or device, which may include hardware, software, firmware and/or any combination thereof, which functions on a computer platform. The computer platform may be disposed with or deployed as a component of an electronic apparatus or device such as a game console, a compact and/or portable gaming device, a workstation, desktop, laptop, hand-held or other computer, a network capable communication device such as a cellular telephone, portable digital assistant (PDA), or the like. One or more of the features described above may be implemented with an integrated circuit (IC) device, configured for executing the features. The IC may be an application specific IC (ASIC) and/or a programmable IC device such as a field programmable gate array (FPGA) or a microcontroller.

Example Procedure

The example procedures described herein may be performed in relation to asynchronous audio for network games. Procedures that may be implemented with an embodiment may be performed with more or less steps than the example steps shown and/or with steps executing in an order that may differ from that of the example procedures. The example procedures may execute on one or more computer systems, e.g., under the control of machine readable instructions encoded in one or more computer readable storage media, or the procedure may execute in an ASIC or programmable IC device.

Figure 1B:
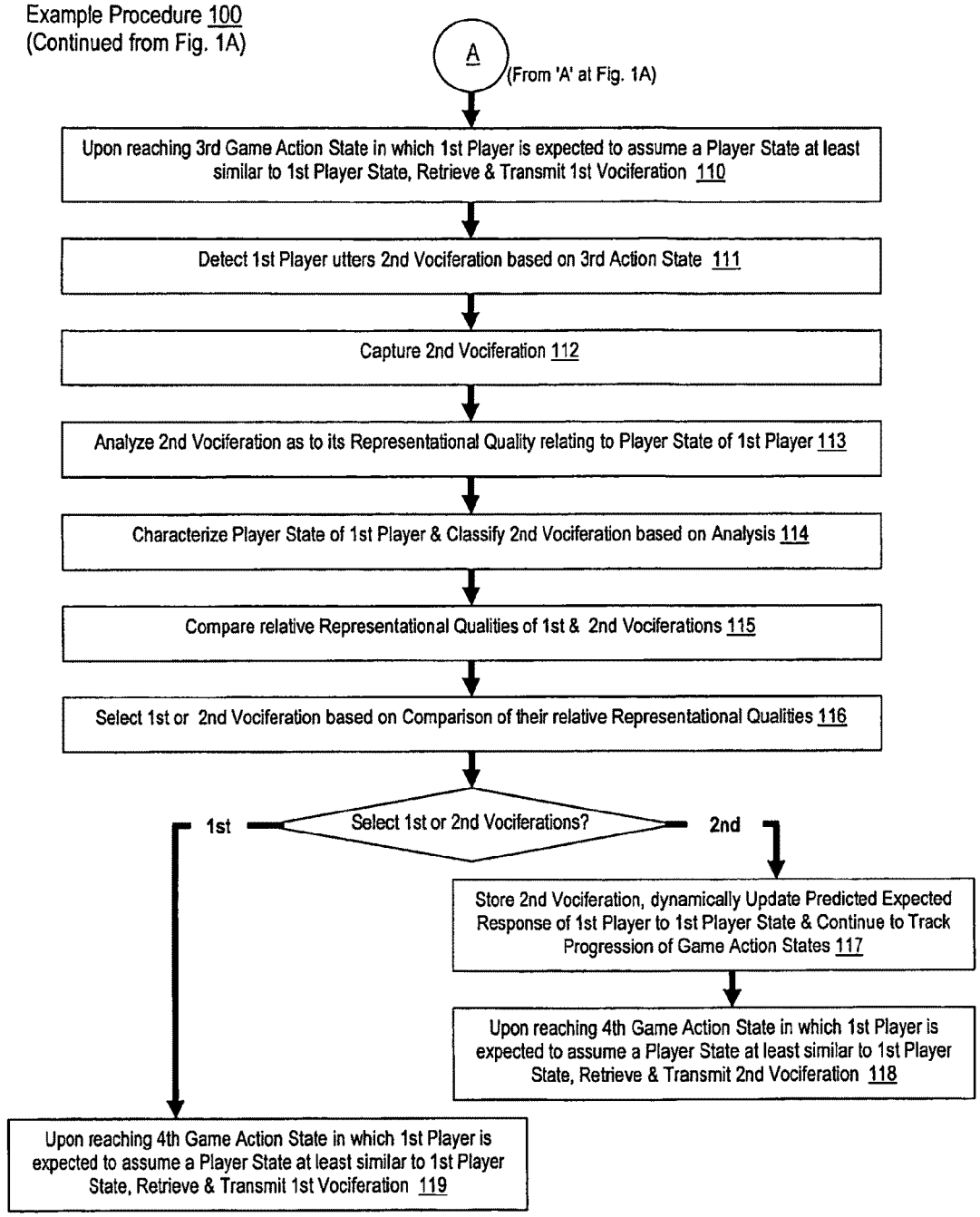

FIG. 1A depicts a flowchart for an example procedure 100, according to an embodiment of the present invention. FIG. 1B depicts a continuation of the flowchart for example procedure 100, which begins at FIG. 1A. Thus, FIG. 1A and FIG. 1B will be described together. Procedure 100 relates to providing audio content for a game that involves multiple players who are communicatively coupled with each other via a network that may include one or more of the Internet, a wide area network (WAN), a local area network (LAN), and multiple and/or various networks.

The description of example procedure 100 begins herein with reference to FIG. 1A. In step 101, action states of the game are tracked as the game progresses. The action states relate to events that occur during the game and a situation of each of the players that corresponds to the events. Upon reaching a first game action state, at least one of the players may be expected to utter a first vociferation based on the players' situation with respect to a game event that occurs in association with the first game action state. Thus in step 102, an attempt is made to detect a first vociferation. If it is detected that the player utters the first vociferation as expected, then in step 103 the first vociferation is captured. Upon its capture, in step 104, the first vociferation is stored and the tracking of the game states continues.

More than one player may utter a vociferation and embodiments are well suited to function in similar ways with multiple vociferations by more than one player and it should be appreciated that an embodiment is not limited to a vociferation by a single player. For simplicity, brevity, and unity of the descriptive example however, a single "first" player will be described herein.

In step 105, the first vociferation is uniquely associating with the player from whom it was uttered. In step 106, the first vociferation is analyzed in relation to its representational quality. Its representational quality relates to how and how well (e.g., affectively, succinctly, associatively, contextually, idiomatically, graphically, accurately, expressively, etc.) the vociferation portrays, e.g., to the other players, a player state of the first player associated with the game event and game state.

In step 107, a first player state is characterized that corresponds to the first vociferation, which is classified based on the characterized first player state and the player with whom it is associated.

Upon reaching a second action state, in which the player is expected to assume (e.g., take on, affect) a player state that is at least similar to the first player state, based on the situation of the player with respect to at least one game event that occurs in association with the second action state, in step 108, the stored and classified first vociferation is retrieved. In step 109, the retrieved first vociferation is transmitted to the other players. The transmission of the vociferation may be asynchronous with respect to its capture. Moreover, the transmission may be made in real time, near real time, and/or non-real time or other than real time and may be made using a low bit rate audio channel.

Where an embodiment is implemented over a network with relatively slow speed or high latency, the vociferation (and related labeling) may be sent over the network to relevant players (e.g., those players affected by a related game event) without intentional delay. The associated vociferation and labeling data may be cached or otherwise stored. The vociferation may then be retrieved and played without significant delay, should a similar game event occur.

While the step 108 describes vociferation related audio data being sent over the network upon occurrence of a second game action step, this description is by way of example and illustration and should not be considered limiting. On the contrary, embodiments are well suited to send vociferation related audio data without intentional delay, e.g., as soon as possible. Thus, triggering or replay of the audio at game devices associated with other relevant players may be based on incoming game events and/or local game state triggers. Upon transmitting the vociferation in step 109, the description of example procedure 100 continues herein at 'A' with reference to FIG. 1B.

It should be appreciated by artisans skilled in fields relating to electronic, computerized, network based, and/or interactive games and related applications and platforms that an arrangement of unique identifiers and caching tables or the like may be used with embodiments of the present invention. For instance, an embodiment uses an arrangement of unique identifiers to keep track of which vociferations have been transmitted to which client game devices. Thus, an embodiment may obviate retransmission of any specific vociferation to a particular player and use instead a short reference or command, which may economize on network resource usage. An embodiment thus allows transmission of vociferations to be ongoing, asynchronous to their capture, and/or sporadic, which may take advantage of periods of relatively low network demand. Transmitting a reference or command achieves a low latency mechanism for triggering replay of an appropriate, previously sent and stored vociferation at remote players' game devices for subsequent suitable (e.g., similar player state invoking) game events and game states. With games that involve situational repetition, an arrangement of asynchronous transmission and remote caching of the audio vociferations, according to an embodiment, achieves a responsive, adaptive, personal and interactive audio component, even under network latency and/or bandwidth constraints that may deter real time synchronous audio communications.

Continuing at 'A' with reference to FIG. 1B, when confronted with one or more game events associated with a game action state that is similar in some sense to the events corresponding to the player's assuming the first player state, the player may be expected to assume a player state similar, at least in part, to the first player state. However, the player may, when so confronted, utter a vociferation independent of, that perhaps contrasts, differs or varies, at least in part, from the first vociferation.

Upon reaching a third action state, the player is expected to assume a player state that is at least similar to the first player state, based on the situation of the player with respect to at least one game event that occurs in association with the third action state. In step 110, the stored first vociferation is retrieved and transmitted to the other players. Further upon reaching the third action state, in step 111 the player's utterance of a second vociferation based on the third action state is detected. Upon detecting that the player does utter a second vociferation based on the third action state, in step 112 the second vociferation is captured.

In step 113, a second representational quality is analyzed, which corresponds to the second vociferation in relation to the first player state. In step 114, the player state corresponding to that player may be re-characterized and/or the second vociferation classified based, at least in part, on the analysis of the second representational quality. In step 115, the first and the second representational qualities are compared in relation to the first player state. The comparison is based, at least in part, on the re-characterization of the player's player state and/or the classification of the second vociferation. For instance, the comparison may support a decision that either the first or the second vociferation may be more representative of the first player state than the other. Based on this comparison, in step 116 either the first vociferation or the second vociferation is selected.

If the second vociferation is selected based on the comparison, in block 117 the second vociferation is stored, the predicted expected response of the player to the first player state is dynamically updated, and the tracking of the progression of game action states continues. Upon storing the second vociferation and updating the predicted expected response of the player to the first player state, a fourth game action state is reached, which is temporally subsequent to at least the third action state with respect to the progression of the game. In the fourth game action state, the player may be expected, based on the situation of the player with respect to at least one game event that occurs in association with the fourth action state, to assume a player state that is at least similar to the first player state. Upon reaching the fourth game action state, in step 118 the stored second vociferation is retrieved and transmitted (e.g., asynchronously with respect to its capture) to the other players.

If however, the first vociferation is selecting based on the comparison, then in step 119, upon reaching the fourth action state, the stored first vociferation is retrieved and transmitted to the other players.

The analysis of the representational quality of the vociferation, in relation to the player state, may include predicting an expected response of the player to one or more events associated with the third action state. The expected response may relate to contextual, emotional, and/or vociferating behavior that corresponds to the player state of the at least one of the players. The predicted expected player response may be dynamically updated based, at least in part, on the detection of the second vociferation and the analysis of its representational quality.

Capturing a player's vociferation may be performed asynchronously in relation to transmitting the captured vociferation to the other players, their situations with respect to a game event that occurs in association with a game action state, situations of a player with respect to at least a second game event that occurs in association with the first action state, and/or the situations of the player with respect to at least a second game action state. The second game event may be independent, at least temporally, with respect to the first game event. Moreover, the second action state may be independent, at least temporally, with respect to the first action state.

An embodiment thus tracks the game state and, as a game event occurs or is about to occur on a user's game device that is expected to possibly trigger a vociferation associated reaction from the player, detects and captures a short sequence of audio aligned with the event. Example game events may include, but are by no means limited to, launching attacks, receiving damage, winning, losing, being surprised, being passed or the like. Game events may, from the perspective of various players, seem good, bad, and/or surprising. Upon capturing a vociferation from a player affected by the game event, corresponding audio content is coded and transmitted to the other players, e.g., over a low bandwidth gaming network. Replay or rendering audio content associated with a vociferation at a client location of one or more other relevant players may be triggered by occurrence of a game state and/or game events (e.g., at least similar to an event that resulted in the utterance of a captured and stored or previously sent vociferation and thus, expected to result in at least a somewhat similar player state in association with the player who uttered the vociferation), local state information, and/or other communications between various client game devices and/or a game server.

In an embodiment, streaming of the audio content may commence before the entire audio sequence corresponding to the uttered vociferation is fully captured. As may relate to bandwidth availability and system and network latencies, the audio sequence may be decoded and replayed at another player's device as soon as is practical, but not necessarily in real time (although embodiments are well suited to real time audio replay, given sufficient availability of computational and network resources). The other players who may be sent the audio content corresponding to the uttered vociferation for replay may be selected based on the game state and, e.g., whether they are involved with or aware of the interaction that triggers the audible vociferation response. Players sent the audio content may be deemed by the game engine to have relevance to the particular game state and/or game events associated therewith and may be referred to herein as relevant players.

Example Implementation Game Scenario

An example implementation of procedure 100 is described herein with reference to a hypothetical network based race game scenario in which multiple players, physically (e.g., geographically) other than proximate (e.g., isolated, remote) from each other, are communicatively coupled via a game supporting network, such as the Internet. The "leader" of the race game is a player whose game car is ahead of the others. In the example herein, the leader is moments from crossing the finishing line and thus winning the race game. Meanwhile, a leader hunting weapon, launched by another player, is chasing the leader down. An audio engine associated with the game engine provides a cue to the leader that this threat is coming, yet the leader hopes to make it through the finish line to win, before the weapon overtakes the leader and sets that player back in the game, removing the player's lead and possibly eliminating that player from the game. To the leader's game demise, the weapon is effective and halts the leader just before the finish line is crossed. The player who was leading is then overtaken by the remaining players.

Game players who are all physically proximate to each other at least within audible range may enjoy a variety of sound events or communications that capture the tension, joys and frustrations of such a sequence. For instance, the player who launches the game weapon may utter a gleeful vociferation in anticipation of the successful play attack of his opponent, the leader. In contrast, the leading player may make an anguished cry as the leader's game car is halted by the game weapon just prior to the finish. Other players, such as the lagging players, may utter a triumphant cry or a gloating or teasing remark as they pass the thwarted leader and complete the race. Embodiments of the present invention allow players who are other than physically proximate to hear these vociferation sounds and thus enjoy this social aspect of the game. However, the embodiments may achieve this function of the audio game play interaction independent of a persistent audio communication link or channel.

The example scenario used herein relates to a genre of a multiplayer racing games. The example game scenario is used herein merely by way of illustration and description, and by no means for any limiting purpose. It should be apparent to skilled artisans in fields related to interactive electronic, computer and/or network based games that a set of game play constructs and associated player vociferations and other sounds, according to embodiments of the present invention, may be used with a wide variety of interactive and/or competitive networked games.

An embodiment functions with an assumption that a competitive and/or interactive networked game includes multiple game states that feature specific events that are expected to stimulate the utterance of a sound vociferation by a player, which may be entertaining to one or more other (e.g., relevant) players. An embodiment economically and flexibly uses game state related data to provide the information to decide when these events occur.

An embodiment functions with assumptions and observations relating to characteristic behavior of players in interactive networked game play. Timing associated with the utterance of entertaining vociferations may be associated with an affective state of the various players, as influenced by identifiable game actions, outcomes, interactions, activities, incidents, occurrences, and/or other vociferations, e.g., uttered by other relevant players. Each of the vociferations may be expected to be relatively short in duration (e.g., less than 10 seconds in length). To be an entertaining sonic component of the game, delivery of the vociferations and related audio communications does not have to be in real time, a given sound sample may be appropriately re-used in subsequent similar situations, and audio fidelity associated with these vociferations and audio communications is not of paramount significance. Realizing that they will be heard by the others, players may be expected exacerbate or elaborate their vociferations and audio communications and/or create a suitably entertaining performance and players may adapt their vociferation behavior, based, at least in part, on the vociferation efforts, creativity, quality, dramatics, and/or enthusiasm exhibited by other players.

An example implementation of procedure 100 is described herein with reference to FIG. 2 through FIG. 11B, inclusive. The example implementation is described in relation to multiple portable network gaming devices. It should be apparent to artisans skilled in fields relating to interactive electronic, computer and/or network based games however, that embodiments are well suited for application to a wide variety of gaming devices and platforms, game capable computers, cellular telephones and other communication devices and electronic apparatus and devices, fixed, portable, and/or mobile.

Figure 2:
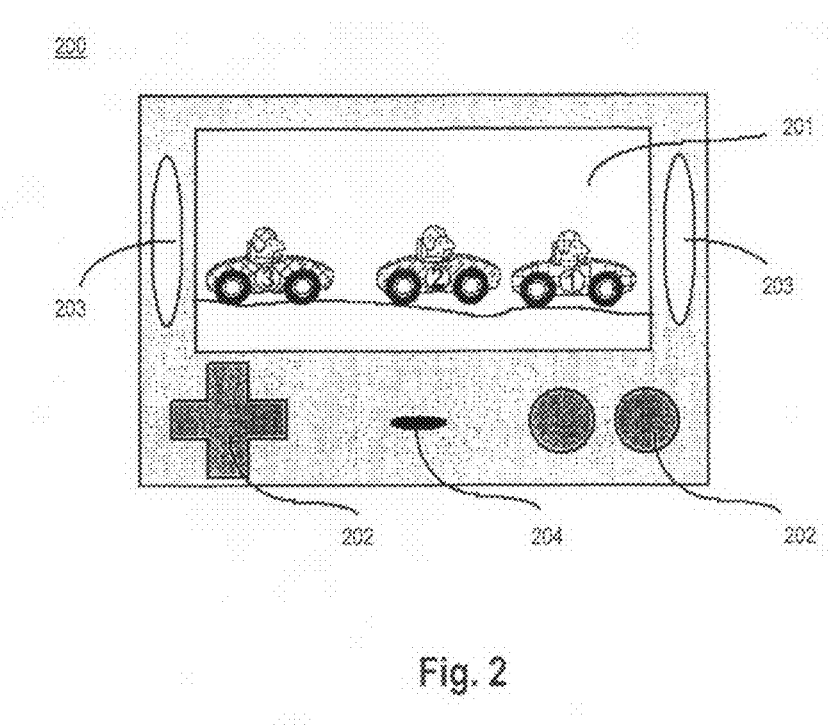
FIG. 2 depicts an example game device, according to an embodiment of the present invention.

FIG. 2 depicts an example game device 200, according to an embodiment of the present invention. Gaming device 200 has a display 201, user (e.g., player) control components 202, speakers 203 for creating game sound, and a microphone 201 for detecting and capturing vociferations and sounds from a player using the device. Game device 200 has an internal communication mechanism, for networking with multiple players and thus sharing the same game environment therewith.

An interactive networked game occurs when two or more people with gaming devices share in a combined game experience. This may be achieved through separate instances of the game application, running on each gaming device and interacting through a network link. Embodiments are well suited to function with network links of fairly low bandwidth capacity; the link however provides sufficient data rates and sufficiently low latency to update the game state in each of the players devices based on the actions of the other players.

Figure 3:
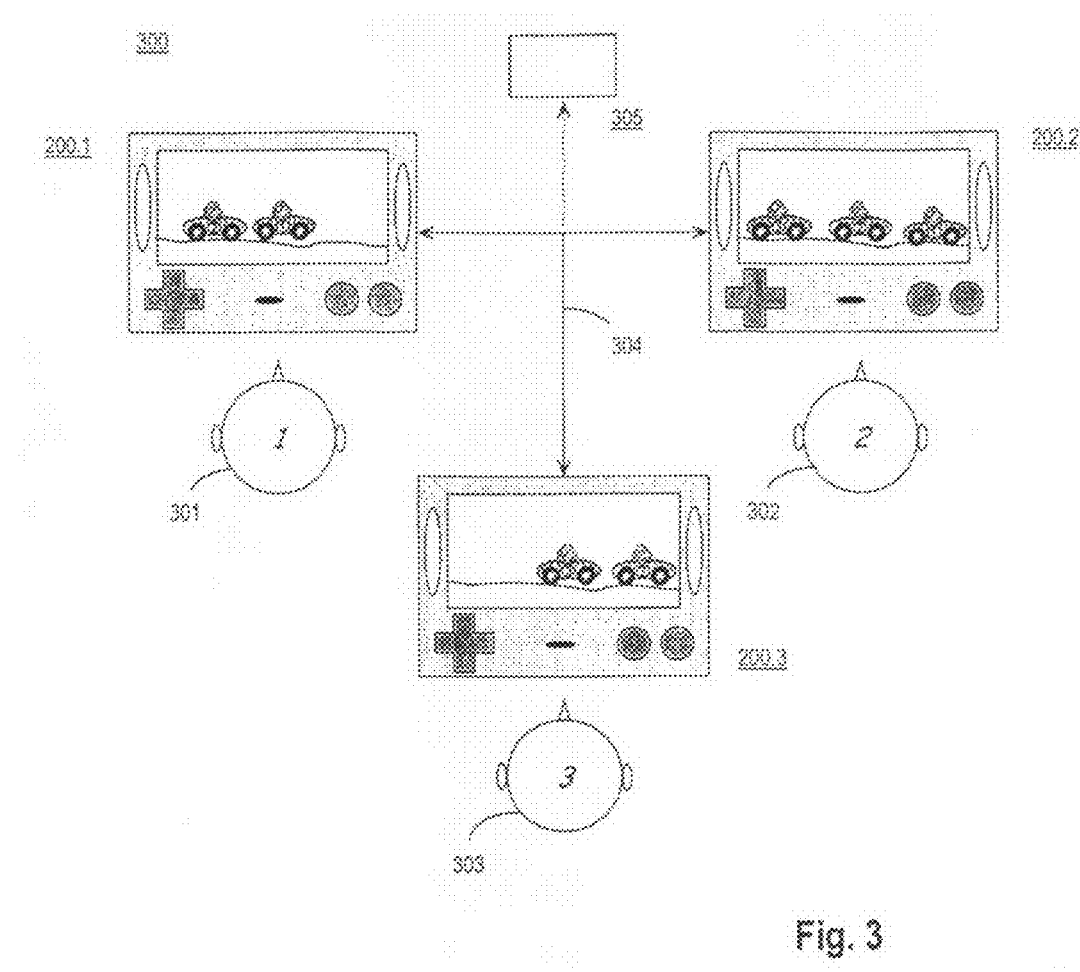
FIG. 3 depicts an example interactive network based game, according to an embodiment of the present invention.

FIG. 3 depicts an example interactive network based game environment 300, according to an embodiment of the present invention. Players 1, 2 and 3 respectively use game devices 200.1, 200.2 and 200.3 (all of which are represented with game device 200; FIG. 2), which are communicatively coupled via network link 304. A number of other player devices, represented by example element 305, may also play. An example game scenario for three players is shown in which, while each player may have a different point of view on their respective display, the state of the game is reasonably consistent across all devices. For instance, player 1 views cars 1 and 2, with car 1 leading, but player 2 views all three cars—car 1 leading and car 3 trailing—and player 3 views only cars 2 and 3, with car 3 trailing. Thus, while all players essentially share the same game state, their views of the game state may vary, perhaps significantly.

The progression of the game state of the game depicted in FIG. 3 is described herein with reference to FIG. 4 through FIG. 10, inclusive. The amount of time that may transpire between successive frames of the sequence depicted in FIG. 4 through FIG. 10, inclusive, may vary and in fact, may not be large. However, the audio interaction depicted therein is asynchronous in nature. Thus, a subjective experience associated therewith may likely be enjoyable by the players irrespective of a reasonable latency. Thus, embodiments of the present invention function without requiring the establishment of a persistent real time interactive audio connection (although embodiments are well suited to function with or exploit such communicative connectivity, as it may be or become available).

Figure 4:
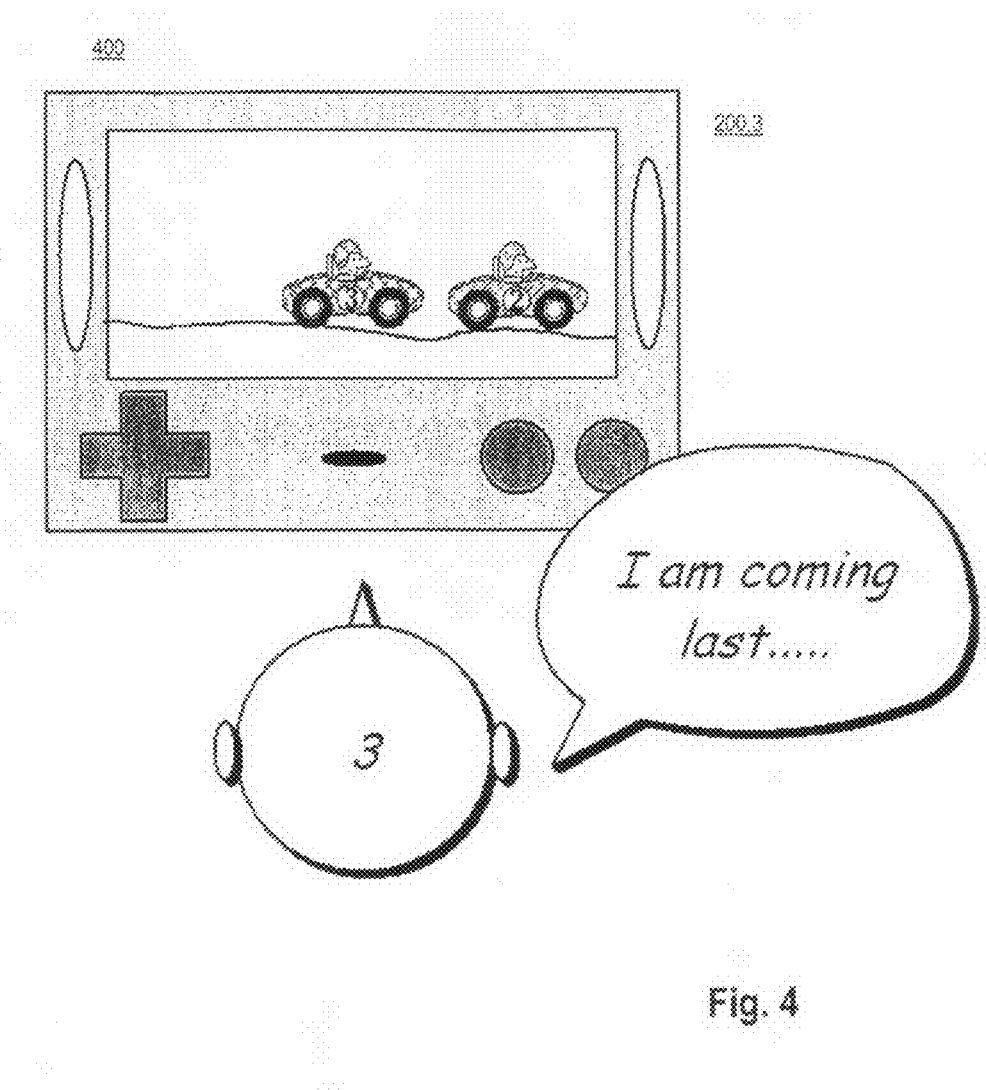
FIG. 4 depicts an example game state, according to an embodiment of the present invention.

FIG. 4 depicts an example game state 400, according to an embodiment of the present invention. Player 3 views the game race from the unique perspective shown on game device 201.3 and realizes that the car with which the player is associated is trailing in the race.

Figure 5:
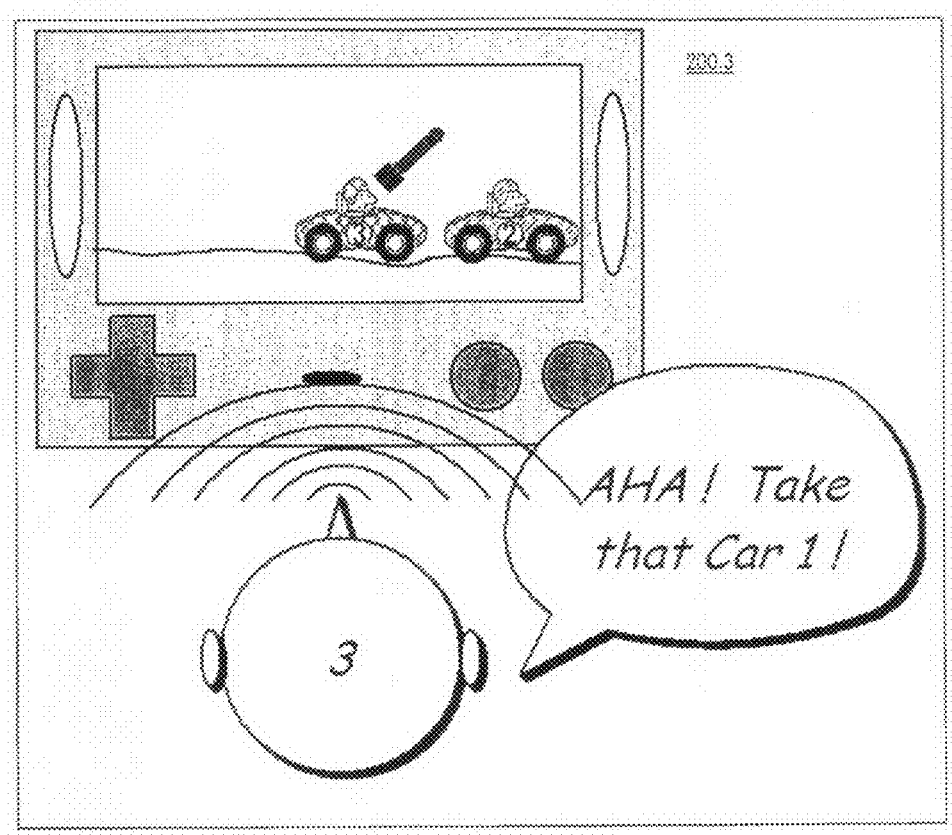
FIG. 5 depicts an example first game event, according to an embodiment of the present invention.

FIG. 5 depicts an example first game event 500, according to an embodiment of the present invention. Player 3 takes a game action with controls of game device 201.3 to launch a leader hunting weapon. As player 3 fires the weapon, the player also utters a vociferation "Aha! Take that Car 1!" that the microphone of game device 201.3 detects and captures.

Figure 6:
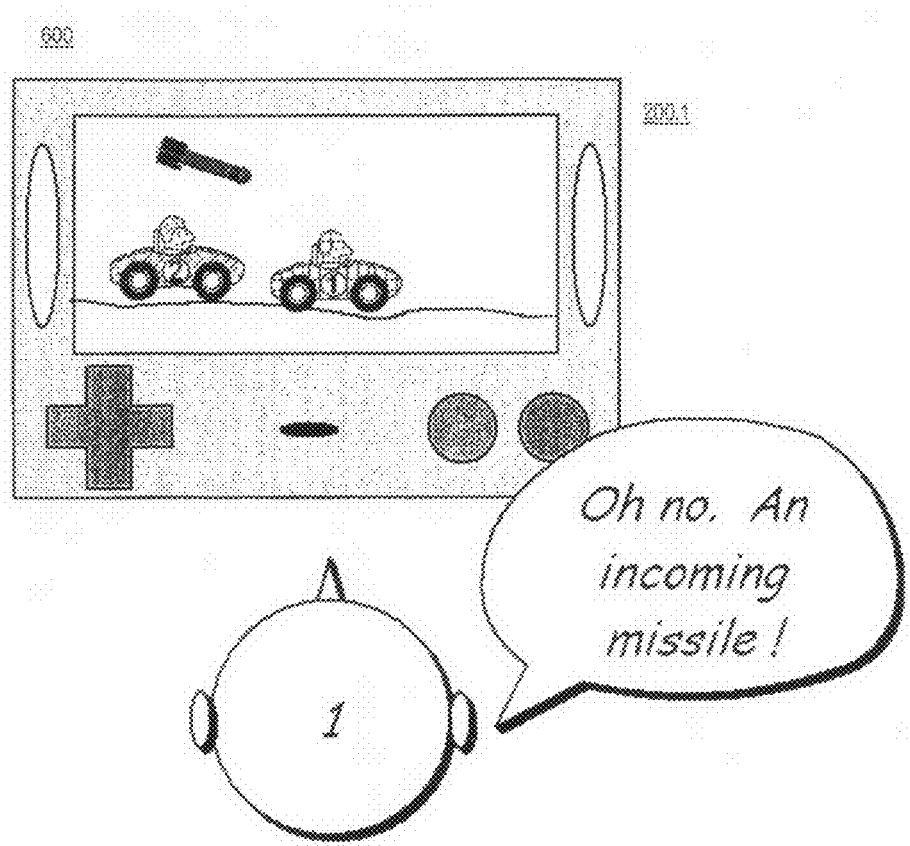
FIG. 6 depicts an example game development, according to an embodiment of the present invention.

FIG. 6 depicts an example game development 600, according to an embodiment of the present invention. Player 1 views the game race from the unique perspective shown on game device 201.1 and soon realizes that the leader hunting weapon is approaching car 1, with which that player is associated. Player 1 may utter a vociferation that expresses concern, such as "Oh no. An incoming missile!" The vociferation may be detected and captured by the microphone of game device 201.1, and may be rendered, e.g., asynchronously, at the game device of one or more of the other players.

Figure 7:
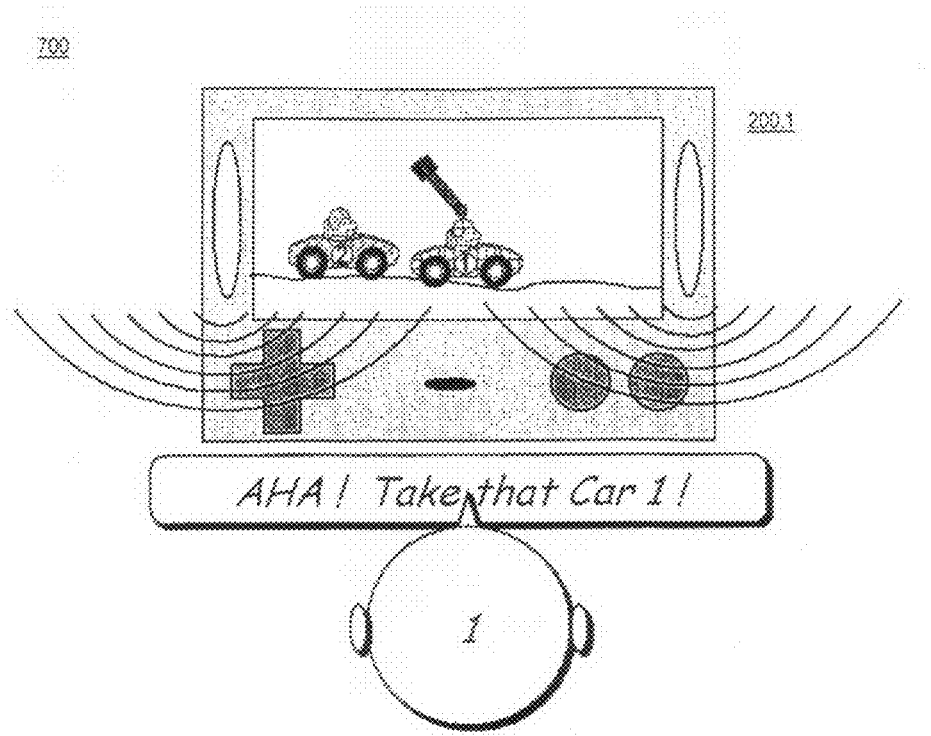
FIG. 7 depicts an example second game event, according to an embodiment of the present invention.

FIG. 7 depicts an example second game event 700, according to an embodiment of the present invention. In example second game event 700, player 1 views the leader hunting weapon overtake & impact car 1. As player 1 views this development, the speakers of game device 201.1 render audio content associated with the vociferation uttered by player 3, as that player launched the leader hunting weapon to assail car 1. Player 1 may thus share in the emotion laden vociferation uttered by player 3, thus enhancing the social connectivity experience of Player 1, as proffered by the game.

Figure 8:
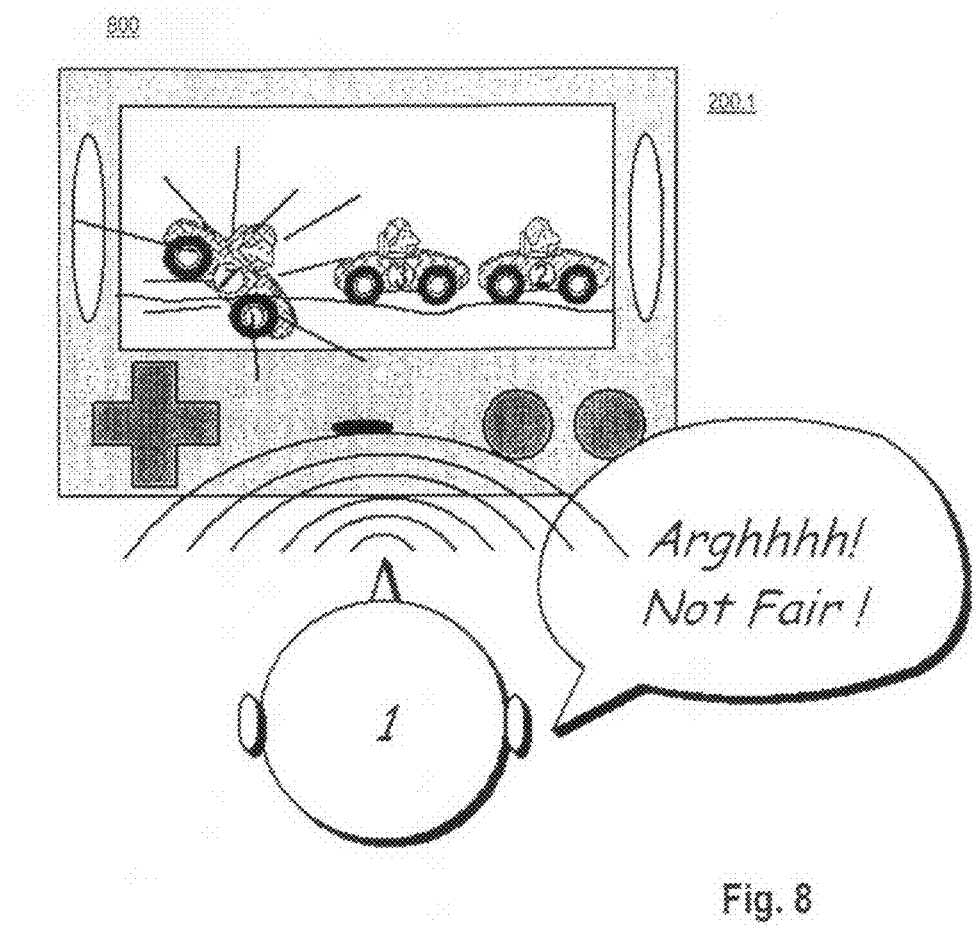
FIG. 8 depicts an example reactive game vociferation, according to an embodiment of the present invention.

FIG. 8 depicts an example reactive game vociferation 800, according to an embodiment of the present invention. Player 1 still views the game race from the unique perspective shown on game device 201.1 and realizes, e.g., to the great consternation of that player, that the leader hunting weapon has removed car 1 from the lead position prior to crossing the finish line, and in fact, removes car 1 from the race. In reaction to the player state that may be expected to ensue from this development, the microphone of game device 201.1 goes live to record any vociferation that player 1 may utter in reaction to this game development event. As depicted, player 1 utters a vociferation reflective of a player state that may have been expected to be associated with the event, such as a perhaps nonsensical exclamatory utterance, followed by an exclamation like "Not Fair!" or "Oh No!" The uttered vociferation is captured by game device 201.1 and transmitted, e.g., asynchronously, to one or more of the other players.

Figure 9:
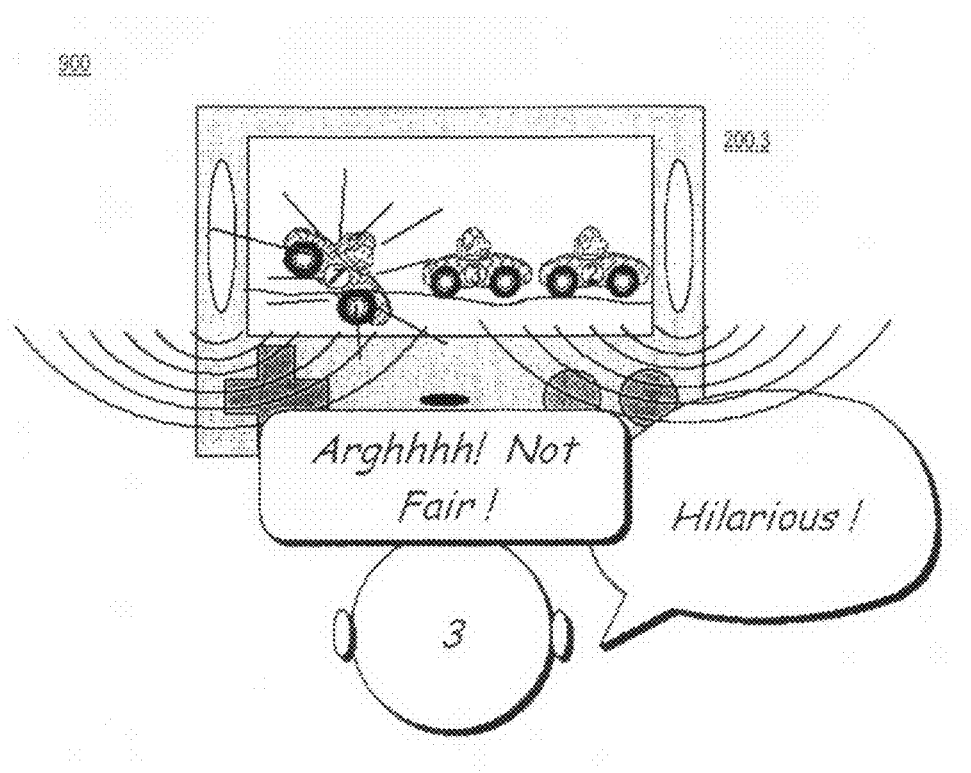
FIG. 9 depicts an example first reaction to the game vociferation, according to an embodiment of the present invention.

FIG. 9 depicts an example first reaction 900 to the game vociferation (e.g., uttered as depicted in FIG. 8), according to an embodiment of the present invention. Player 3 still views the game race from the unique perspective shown on game device 201.3, which may be similar to the game state shown to player 1 by game device 201.1. Player 3 realizes, e.g., to the great amusement and/or delight of that player, that the leader hunting weapon has removed car 1 from the lead position prior to crossing the finish line, and in fact, removes car 1 from the race. The speakers of game device 201.3 render the vociferation uttered by player 1 as car 1 is struck by the game's leader hunting weapon. In reaction, player 3 may utter a vociferation such as "Hilarious!" to express a player state associated with the subjective or affective player state of player 3, which may be captured by the microphone of game device 201.3 and sent, e.g., asynchronously, to one or more other players.

Figure 10:
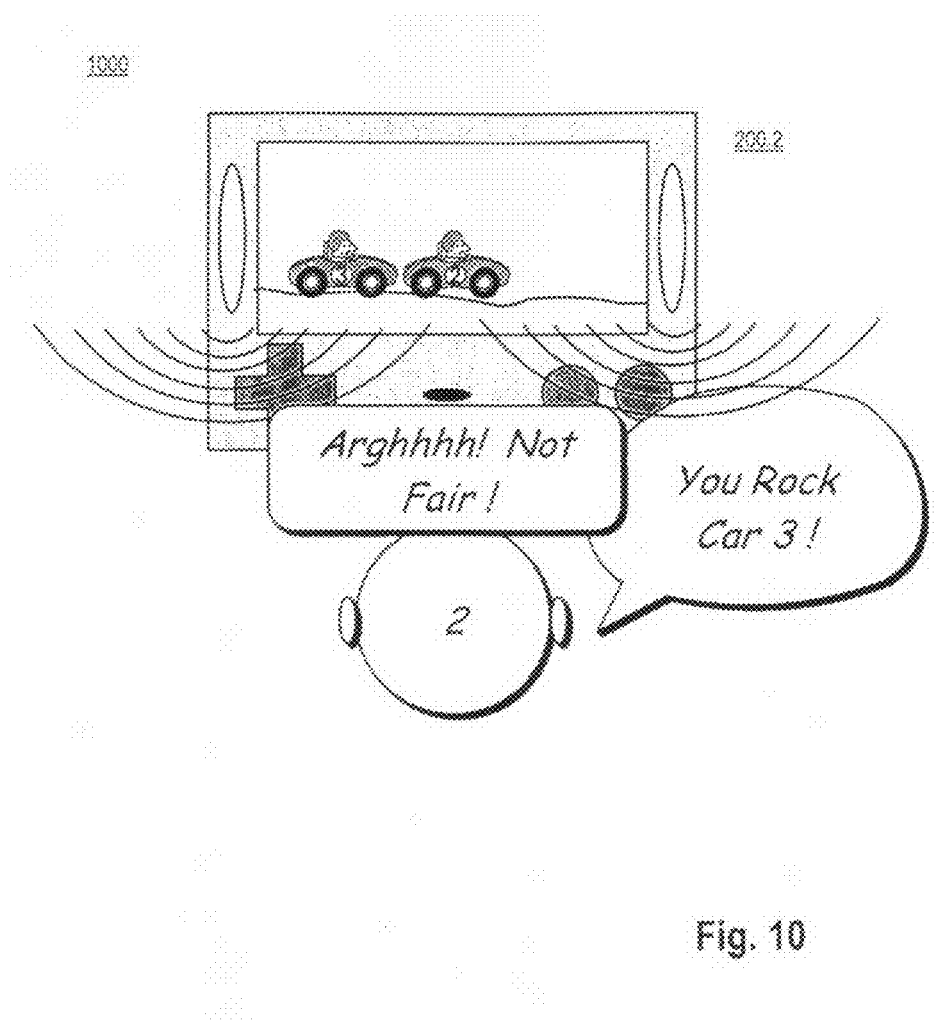
FIG. 10 depicts an example second reaction to game vociferation, according to an embodiment of the present invention.

FIG. 10 depicts an example second reaction 1000 to the game vociferation, according to an embodiment of the present invention. Player 2 views the game race from the unique perspective shown on game device 201.2 and realizes, e.g., to the amusement of that player, that car 2, with which that player is associated, is now in the lead position, since car 1 was eliminated by the action taken by player 3. The speakers of game device 201.2 render the vociferation uttered by player 1 as car 1 is removed from the lead position and eliminated. In reaction, player 2 may utter a vociferation such as "You rock Car 3!" to express a player state associated with the subjective or affective player state of player 2, which may be captured by the microphone of game device 201.2 and sent, e.g., asynchronously, to one or more other players.

Example Audio Capture and Replay Procedures

Figure 11A:
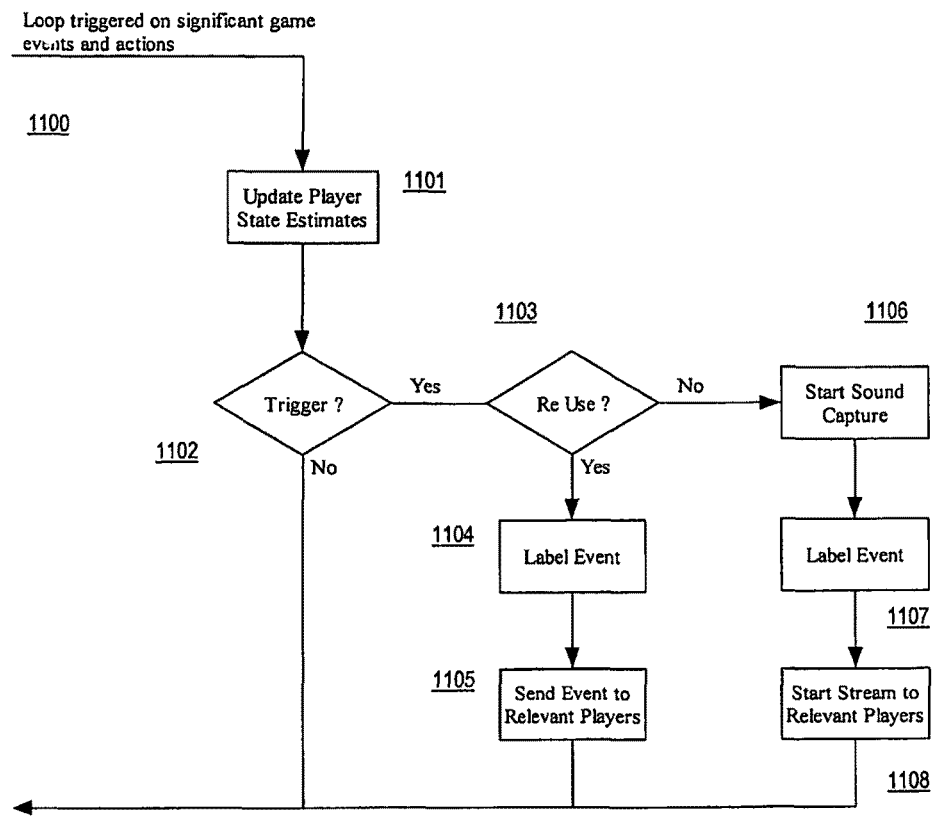
FIG. 11A, FIG. 11B and FIG. 11C respectively depict second, third, and fourth example procedures, according to embodiments of the present invention.
Figure 11B:
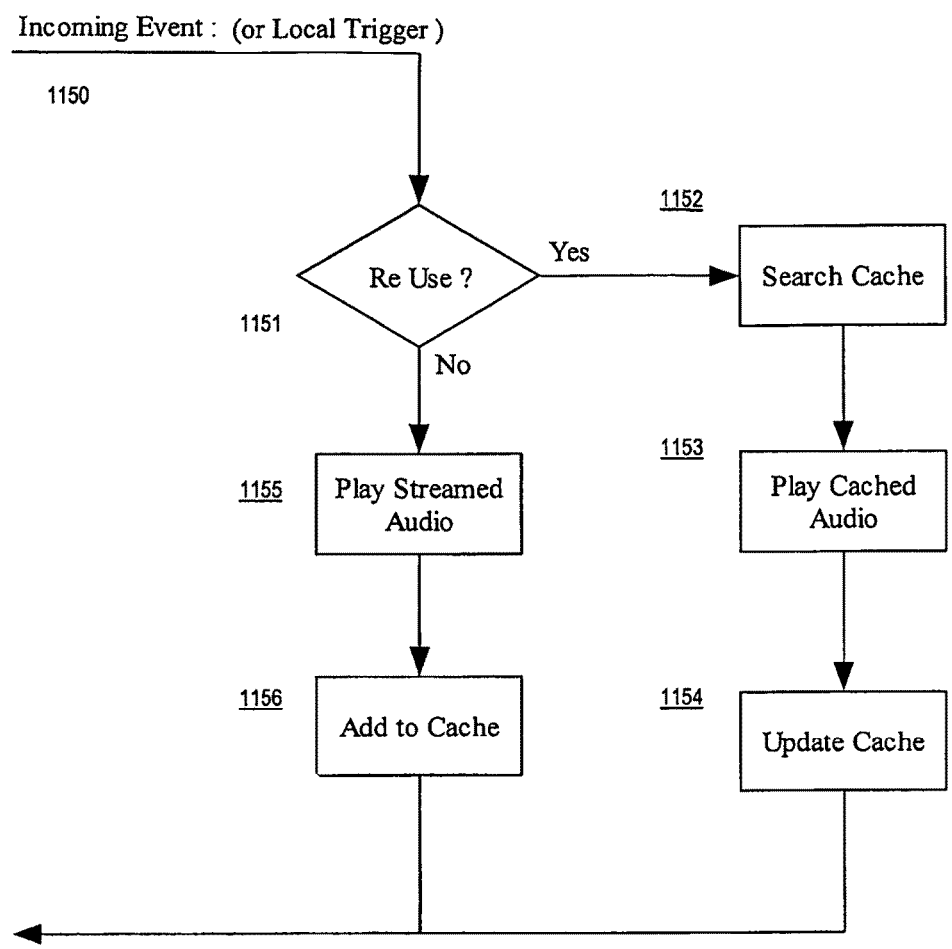
Figure 12:
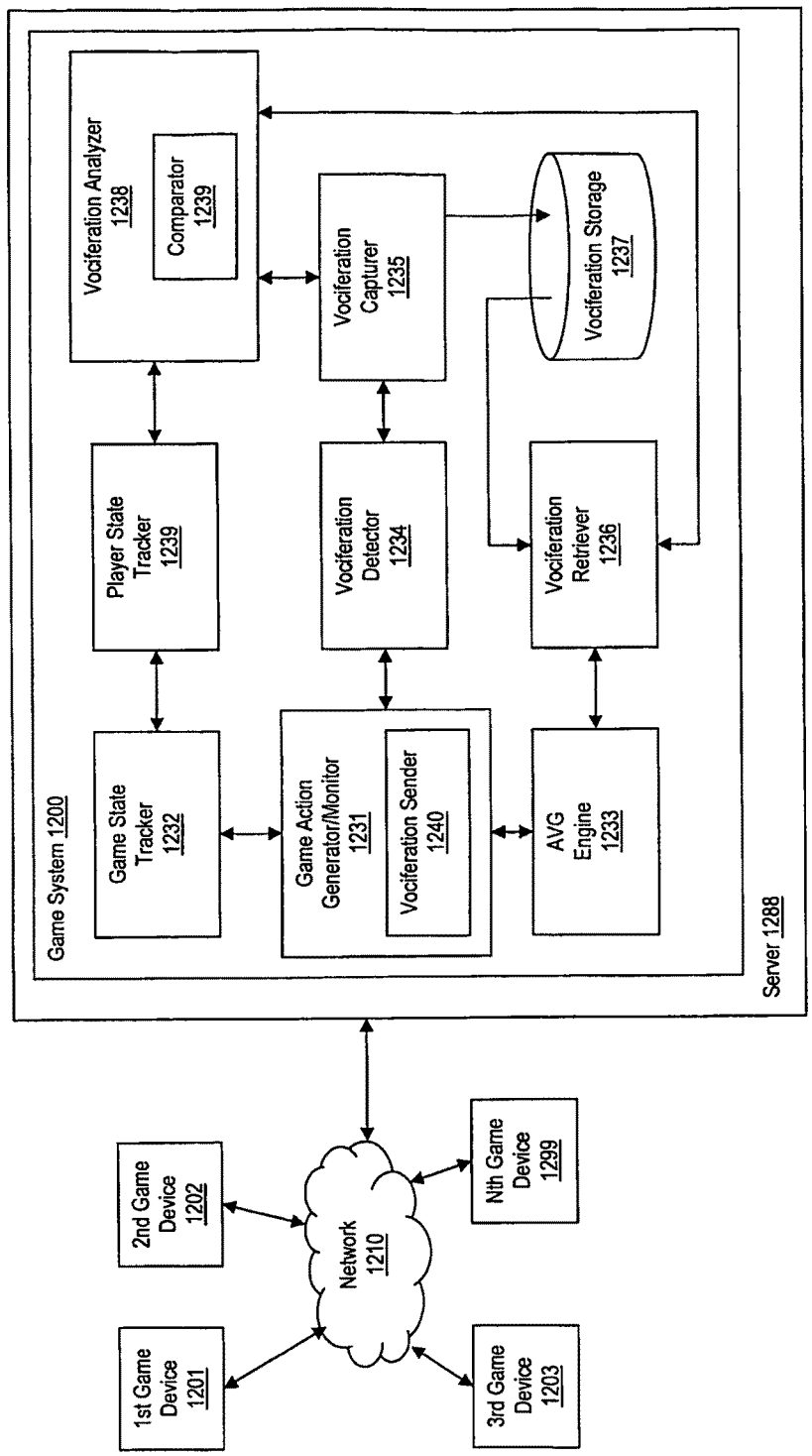
FIG. 12 depicts an example game system, according to an embodiment of the present invention.

An embodiment of the present invention relates to an additional component for interactive online games and involves a combination of software and hardware related to the game implementation. An example implementation is described herein with reference to several procedures with which software based instructions may be executed according to an embodiment. It should be apparent to skilled artisans in fields related to interactive electronic, computer and/or network based games that, in a multiple user networked game environment, the procedures may run on either the local game clients (e.g., game device 200; FIG. 2) or a central or designated server (e.g., server 1288; FIG. 12). Embodiments are well suited to various functionality and decision making distributions in applications that relate to different game architectures. An embodiment of the present invention relates to the automated capture and asynchronous distribution of short audio segments derived from the game players. FIG. 11A and FIG. 11B respectively depict second and third example procedures, according to embodiments of the present invention.

An affective state of a game player may be referred to herein as a player state. The player state may be modeled for the players that are within each of the other players' sphere of game interactivity or influence. It should be appreciated that, as used herein, the sphere of game interactivity or influence may relate to other factors in addition to (or besides) virtual game proximity, because the game play itself may involve virtual long range interactions. For example, some games may feature a sniper rifle with a first person shooter, or tactical long range attacks in a multiplayer territorial strategy game. Thus the type and nature of the player state information estimated may relate to the design of a particular game.

Player (e.g., agent) state modeling may be used to direct, control or influence actions and activities of autonomous agents and/or artificial intelligence in the game. The affective state (e.g., player state) of a local player or local game environment may be modeled to provide appropriate levels of difficulty or trigger subsequent game events and timing. For example, an affective player state of dismay may be expected in response to game states or events that include a loss, injury or setback. An affective player state of frustration may be expected in response to a failed attempt. An affective player state of victorious glee may be expected in response to a successfully executed attempt or attack. An affective player state of excitement may be expected in response to a game state that includes an approaching goal, engagement or end point. An affective player state of alarm may be expected in response to a threat of loss, injury, impending attack or setback. It should be apparent to skilled artisans in fields related to interactive electronic, computer and/or network based games that the foregoing examples are presented herein by way of illustration and are by no means limiting.

Modeling the affective player states may be performed with varied levels of complexity. This is at least partially due to the fact that different game states and/or different game events may be expected to trigger different predicted player states. For example, a simple single game event trigger may correspond to a "death," "injury," or "damage," which may be predicted to trigger a Dismay capture. Game events and game states may also accumulate and decay. Thus, each game event may contribute a certain amount to a set of game state variables. The game state variables may then decay over time. Thus, triggers may result from several less significant events occurring within a relatively short time, or a single critical event (e.g., of relatively short duration). More complex artificial intelligence or fuzzy logic rules may also be used to model player states.

FIG. 11A depicts example procedure 1100 for audio capture decision making, according to an embodiment of the present invention. An example flow of information from game events, to player state models, to the decision to capture and replay audio is shown. Procedure 1100 is triggered upon the development of a significant game state or the occurrence of a significant game event or action. In step 1101, player state estimates are updated. In step 1102, it is decided whether audio capture is to be triggered. If so, then step 1103 a decision is made whether to reuse the captured audio. If not, procedure 1100 loops, e.g., awaiting the development of a significant game state or the occurrence of a significant game event or action.

If a decision is made in step 1103 to reuse captured audio, then in step 1104 the event that triggered the capture is labeled. In step 1105, the event is sent to other relevant players, along with a flag, which may be set to re-use a previously captured audio segment. If a decision is made in step 1103 to not reuse previously captured audio, then in step 1106 sound capture commences. In step 1107 the event that triggered the capture is labeled. In step 1108, streaming of the captured sound to other relevant players commences.

A decision to capture and stream audio, or to simply send the event, e.g., with a flag set to re-use a previous audio capture may be based on several factors. For instance, the decision to capture and stream audio or send the event flagged to re-use previously captured audio content may relate to bandwidth availability, a similarity of the player state estimate to previous audio captures, and/or representational or other quality and content and context factors that may relate to previous audio captures. In capturing the audio content, additional processing may be performed to reduce or remove silence and/or improve the timing of the audio sample around player vocalizations. Processing may also estimate the amount or level of sound activity from a player above background noise. Thus, audio streaming decisions may be made based, at least in part, on a sufficiency and/or audio quality associated with the audio content. An embodiment may be implemented with a network that may be characterized by relatively low latency and relatively high speeds associated therewith. However, an embodiment may be implemented with a network that may function with relatively higher latency and/or lower speed, e.g., as described below with reference to FIG. 11C.

Labeling of a sound related game event may include the type of the game event and the identities of which players that were affected or related to the game event and the captured sound corresponding thereto. The type of the game event may be represented by a set of player state estimates that are stored at the time of the audio capture. Labeling information may be used by the recipients of the streamed audio to control the timing and reuse of the audio segment.

FIG. 11B depicts example procedure 1150 for audio replay decision making, according to an embodiment of the present invention. Incoming game events are received from at least one other player. Incoming events may relate to new audio content, such as a newly emitted vociferation, or to a suggested reuse of a previously received audio file. Alternatively or additionally, a game may draw from a cache of vociferation without an external trigger, e.g., based on a local trigger. In an embodiment, a local cache of audio files relating to the game is maintained. Previously received audio segments that are to be reused may be retrieved from the audio cache. An embodiment is thus well suited to function with a network connection that may be constrained by latency and/or limited bandwidth, over which streaming of new audio content in a reasonably sufficient time to maintain relevance to a current or developing game state may be other than optimal or impractical.

When operable with a latency or bandwidth constrained network, client game devices may preferably cache virtually all incoming audio content, for selective recall for subsequent events that are similar, at least in part (e.g., in some relevant aspect), with the game event that triggered the fresh audio content. When operable in constrained network environments, client game devices may rarely execute play of streamed audio content. It should be apparent to skilled artisans in fields related to interactive electronic, computer and/or network based games however, that embodiments are also well suited to function in networks with less constraint on speed and bandwidth. When operable in such relatively unconstrained network environments, client game devices may selectively execute play of streamed audio content somewhat more freely.

In step 1151, a conditional branch is reached in which either previously received audio content is to be reused or streaming audio content is to be played. If previously received audio content is to be reused, then in step 1152 cached audio content is searched for an appropriately relevant audio segment. In step 1153, the audio segment is retrieved from the cache and played (e.g., rendered audibly) with the game device. In step 1154, the audio file cache is updated, e.g., with use information relating to the audio content just rendered such as the triggering game event, corresponding game state, other relevant players and their estimated player states and the like.

If streaming audio content is to be played at step 1151, then in step 1155 the streaming audio content is played. In step 1156, the freshly streamed audio content is cached. In an embodiment, individual commands or messages may thus specify (1) "a new vociferation is detected: play and cache the new vociferation, and (2) "a reference to a previously sent and stored vociferation is received: retrieve and play the stored (e.g., cached) vociferation." An embodiment may be implemented with a network that may be characterized by relatively low latency and relatively high speeds associated therewith. However, an embodiment may be implemented with a network that may function with relatively higher latency and/or lower speed, e.g., as described below with reference to FIG. 11C.

Figure 11C:
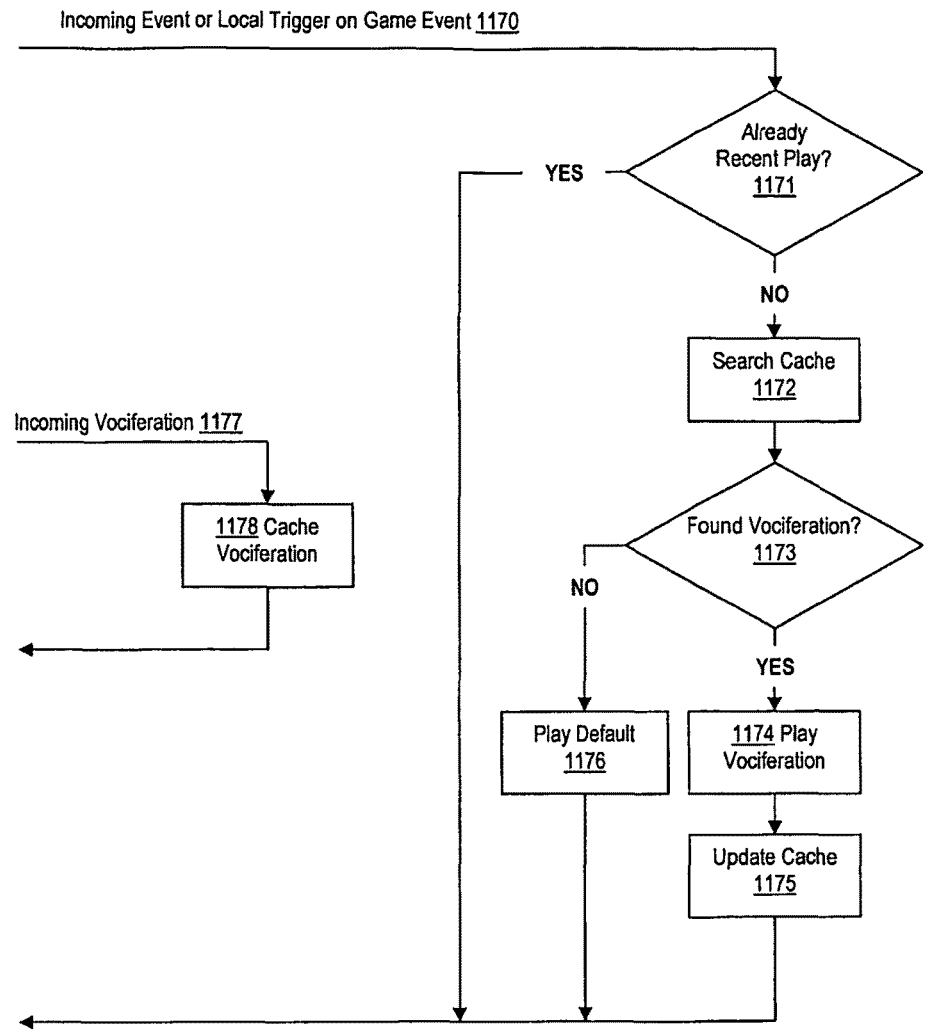

FIG. 11C depicts example procedure 110 for audio replay decision making, according to an embodiment of the present invention. For an incoming event (or local trigger on a game event) 1170, it is tested in step 1171 whether a related vociferation has recently been played or is playing (e.g., currently). If so, no need exists to trigger use of a vociferation or other sound. If not, then in step 1172, the cached vociferations are searched. In step 1173, it is determined whether a suitable cached vociferation is found (e.g., a vociferation that may be associated with a player state at least a somewhat similar to that which resulted in a player who uttered the cached vociferation). If a cached vociferation is not found, then in step 1176, a default vociferation may be played. If a cached vociferation is found, then in step 1174, the found vociferation may be retrieved played. In step 1175, the cache is updated to reflect the recent play of the vociferation. In step 1178, an incoming vociferation 1177 is cached for analysis, future retrieval and/or play. Thus, an embodiment allows audio playback to be triggered at players' client devices by a local game state, which achieves a low relative playback latency, or a message received from another player. Thus in fast action games, such as an example race game, in which game conditions may trigger multiple sounds or vociferations in relatively close temporal proximity, the testing in step 1171 achieves use of one sound or vociferation per game event, whether or not multiple triggers occur.

It should be apparent to skilled artisans in fields related to interactive electronic, computer, and/or network based games embodiments of the present invention thus allow the development of a system to allow the adaptive and dynamic update of the game sound scheme using audio segments from the players of the game. Embodiments relate to audio capture, distribution and replay that is asynchronous and that is automated, based on game events and player state estimates. Moreover, embodiments share and render audio segments asynchronously, independent from the explicit control of the game players.

Example Game System with Asynchronous Audio

Figure 13:
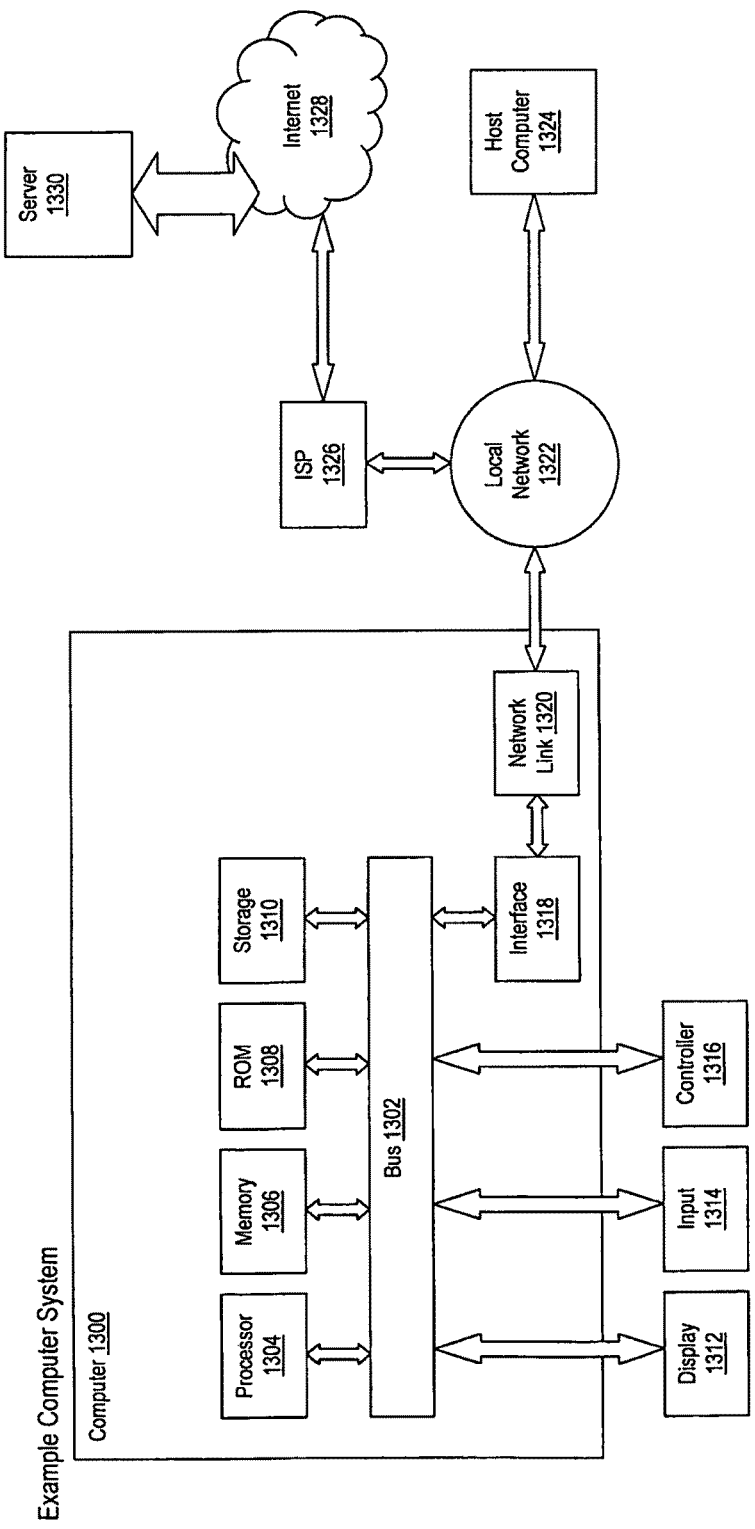
FIG. 13 depicts an example computer platform, with which an embodiment of the invention may be practiced.

As discussed above, an embodiment of the present invention relates to an additional component for interactive online games and involves a combination of software and hardware that relates to the game implementation. A game system may include or use hardware and/or software to execute procedures and game implementations described herein. Game systems may be implemented in various embodiments on one or more computer platforms (e.g., computer system 1300; FIG. 13) or with an ASIC, FPGA, microcontroller, etc. Moreover, embodiments are well suited to function with various game network architectures which include, but not limited to, client-server, distributed server, server and server-less, distributed, peer-to-peer, and hub and spoke.

FIG. 12 depicts an example game system 1200, according to an embodiment of the present invention. System 1200 functions in relation to providing asynchronous audio for an interactive network based game. System 1200 may thus implement procedures described herein such as example procedure 100 (FIG. 1A-1B). In an embodiment, a server 1288 is configured (e.g., with software and/or hardware) to host, deploy and/or feature game system 1200. Server 1288 and game system 1200 are communicatively coupled to multiple game devices (e.g., game devices 200.1-200.3; FIG. 3) via a network 1210 such as the Internet. Server 1288 provides the communicative and networking functionality to couple game system 1200 via network 1210 with the multiple game devices.

Game system 1200 and one or more (e.g., a counting number N) client game devices are communicatively coupled via a network 1210 to configure a game environment (e.g., example game environment 300; FIG. 3). In the example implementation shown, the game devices include a first game device 1201, a second game device 1202, a third game device 1203, and an Nth game device 1299. In another embodiment, an instance of game system 1200 may execute or be disposed within or deployed with one or more of the multiple client game devices (thus represented herein by server 1288).

Game system 1200 includes a game action generation and monitoring engine 1231 (which may be referred to herein as a game action generator/monitor). Game action generator/monitor 1231 functions to generate game states and game events that are selectively sent to one or more of the multiple client game devices and receive game related actions and events therefrom, including audio content such as player vociferations.

An audio, video and graphics (AVG) engine 1233 functions with game action generator/monitor 1231 to generate and process audio, video and graphics content relating to the progression of the game. In an embodiment, AVG engine 1233 may be a component of server 1288 (or in an alternative embodiment, one or more of the game devices) that is used by game action generator/monitor 1231 for AVG related processing.

Game state tracker 1232 functions with game action generator/monitor 1231 to track the progression of the game state. A player state tracker 1239 functions with game state tracker 1232 to analyze player responses to developing game states and game events and thus, to predict an expected player state corresponding thereto. In another embodiment, game state tracker 1232 and player state tracker 1239 may function as a unitary component.

Game system 1200 includes at least one component, the function of which relates to player vociferations. The vociferation related functions of game system 1200 may be implemented with multiple vociferation components, as depicted in the example shown in FIG. 12. Alternatively, the function of one or more of the vociferation related components may be combined.

With reference to FIG. 12, game system 1200 receives audio content relating to player vociferations, which may be uttered in response to a developing game state or game events that may be transpiring. Game system 1200 receives player vociferations with a vociferation transceiver ("Xceiver") component 1240. Vociferation transceiver 1240 may comprise a component of game action generator/monitor 1231.

Upon receipt with vociferation transceiver 1240, the vociferation is detected with vociferation detection component 1234. Upon detection with vociferation detector 1234, the vociferation is captured with vociferation capture component 1235. Upon capture with vociferation capturer 1235, the vociferation may be stored with vociferation storage 1237. The vociferation may also be analyzed with vociferation analyzer 1238.

Vociferation analyzer 1238 analyzes captured vociferations, such as to detect a representational quality, which corresponds to the vociferation in relation to a player state. The representational quality of a vociferation may be an input to player state tracker 1239, as information from which a player state may be estimated, at least in part.

Vociferations stored with storage 1237 may be retrieved with vociferation retrieving component 1236 and supplied to vociferation transceiver 1240, e.g., with AVG engine 1233, for transmission to relevant other players, possibly with game audio effects as well as associated video features and/or graphical effects. Vociferation retriever 1236 may also provide retrieved vociferations to vociferation analyzer 1238.

Vociferation analyzer 1238 may function with a vociferation comparator 1239. Vociferation comparator 1239 may compare a representational quality of a captured vociferation with the representational quality of a stored vociferation. Based on the function of vociferation comparator 1239, vociferation analyzer 1238 may determine that either the stored vociferation or a freshly captured vociferation better represents a certain player state. Such information may be supplied to player state tracker 1239 as well as used to select whether the freshly captured vociferation, e.g., with a superior representational quality in relation to a certain player state, should be stored with vociferation storage 1237 and thus replace a previously stored vociferation, e.g., with an inferior representational quality in relation to that same player state.

Example Computer System Platform

FIG. 13 depicts an example computer system platform 1300, with which an embodiment of the present invention may be implemented. Computer system 1300 includes a bus 1302 or other communication mechanism for communicating information, and a processor 1304 coupled with bus 1302 for processing information. Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a liquid crystal display (LCD), cathode ray tube (CRT) or the like, for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Embodiments of the present invention related to the use of computer system 1300 for asynchronous audio for interactive network based gaming. According to one embodiment of the invention, asynchronous game audio is provided by computer system 1300 in response to processor 1304 executing one or more sequences of one or more instructions contained in main memory 1306. Such instructions may be read into main memory 1306 from another computer-readable medium, such as storage device 1310. Execution of the sequences of instructions contained in main memory 1306 causes processor 1304 to perform the process steps described herein. One or more processors in a multi-processing arrangement may also be employed to execute the sequences of instructions contained in main memory 1306. In alternative embodiments, hard-wired circuitry may be used in place of or in combination with software instructions to implement the invention. Thus, embodiments of the invention are not limited to any specific combination of hardware circuitry and software.

The term "computer readable medium," as used herein, may refer to any medium that participates in providing instructions to processor 1304 for execution. Such a medium may take many forms, including but not limited to, nonvolatile media, volatile media, and transmission media. Nonvolatile media includes, for example, optical or magnetic disks, such as storage device 1310. Volatile media includes dynamic memory, such as main memory 1306. Transmission media includes coaxial cables, copper wire and other conductors and fiber optics, including the wires that comprise bus 1302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other legacy or other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1304 for execution. For example, the instructions may initially be carried on a magnetic disk of a remote computer. The remote computer can load the instructions into its dynamic memory and send the instructions over a telephone line using a modem. A modem local to computer system 1300 can receive the data on the telephone line and use an infrared transmitter to convert the data to an infrared signal. An infrared detector coupled to bus 1302 can receive the data carried in the infrared signal and place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card or a digital subscriber line (DSL), cable or other modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, optical, radio or other electromagnetic signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the worldwide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are exemplary forms of carrier waves transporting the information. An interactive network game environment (e.g., game environment 300; FIG. 3) with other computer systems, game devices, apparatus and the like may be configured via one or more of the networks. Moreover, one or more of the other game devices or game servers (e.g., server 1288; FIG. 12) in the network game environment may be implemented with a computer system that is similar, at least in part, to computer system 1300.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318. In accordance with the invention, one such downloaded application provides for asynchronous audio for interactive network based games, as described herein.

The received code may be executed by processor 1304 as it is received, and/or stored in storage device 1310, or other non-volatile storage for later execution. In this manner, computer system 1300 may obtain application code in the form of a carrier wave.

EXAMPLES

In an embodiment, a method comprises or a computer-readable medium carrying one or more sequences of instructions, which instructions, when executed by one or more processors, cause the one or more processors to carry out the steps of: in a game wherein a plurality of players of the game are communicatively coupled with a network, tracking a progression of one or more action states of the game wherein the one or more action states relate to one or more events that occur during the game and a situation of each of the players that corresponds to the one or more events; upon reaching a first action state wherein at least one of the players is expected, based on the situation of the at least one player with respect to at least one game event that occurs in association with the first action state, to utter a first vociferation based on the first action state, detecting whether the first vociferation is uttered; and capturing the first vociferation.

In an embodiment, a method or computer-readable medium further comprises upon capturing the first vociferation, uniquely associating the first vociferation with the at least one of the players from whom the first vociferation was uttered; characterizing a first player state that corresponds to the first vociferation; and classifying the first vociferation based on the characterized first player state and the at least one of the players with whom the first vociferation is associated.

In an embodiment, a method or computer-readable medium further comprises at least one of storing or commencing transmission of the classified first vociferation; and continuing the tracking the action states step.

In an embodiment, a method or computer-readable medium further comprises upon reaching a second action state wherein the at least one of the players is expected, based on the situation of the at least one player with respect to at least one game event that occurs in association with the second action state, to assume a player state that is at least similar to the first player state, retrieving the stored first vociferation that is uniquely associated with the at least one of the players and classified based on the characterized first player state thereof; and at least one of transmitting the retrieved first vociferation, or a previously transmitted reference thereto, to other players wherein the first vociferation is rendered locally with respect to the other players.

In an embodiment, a method or computer-readable medium further comprises the plurality of players of the game are communicatively coupled with a network in at least one of a real time, a near real time, or an other than real time condition; and the transmitting step is performed, at least in part, asynchronously with respect to the capturing step.

In an embodiment, a method or computer-readable medium further comprises analyzing a first representational quality, which corresponds to the first vociferation in relation to the first player state; wherein one or more of the characterizing and classifying steps are based, at least in part, on the analyzing step.

In an embodiment, a method or computer-readable medium further comprises upon reaching a third action state wherein the at least one of the players is expected, based on the situation of the at least one player with respect to at least one game event that occurs in association with the third action state, to assume a player state that is at least similar to the first player state, retrieving the stored first vociferation; transmitting the retrieved first vociferation to the other players wherein the first vociferation is rendered locally with respect to the other players; further upon reaching the third action state, detecting whether the at least one of the players utters a second vociferation based on the third action state; upon detecting that the at least one of the players utters a second vociferation based on the third action state, capturing the second vociferation; analyzing a second representational quality, which corresponds to the second vociferation in relation to the first player state; repeating at least one of the characterizing and classifying steps based, at least in part, on the analyzing the second representational quality step; comparing the first and the second representational qualities in relation to the first player state based, at least in part, on the repeating at least one of the characterizing and classifying steps; and based on the comparing step, selecting either the first vociferation or the second vociferation.

In an embodiment, a method or computer-readable medium further comprises upon selecting the second vociferation: storing the classified second vociferation; upon storing the second vociferation and upon reaching a fourth action state wherein the at least one of the players is expected, based on the situation of the at least one player with respect to at least one game event that occurs in association with the fourth action state, to assume a player state that is at least similar to the first player state and wherein the fourth action state is temporally subsequent to at least the third action state with respect to the game, retrieving the stored second vociferation; and transmitting the retrieved second vociferation to the other players wherein the second vociferation is rendered locally with respect to the other players; and upon selecting the first vociferation: upon reaching the fourth action state, retrieving the stored first vociferation; and transmitting the retrieved first vociferation to the other players wherein the first vociferation is rendered locally with respect to the other players.

In an embodiment, a method or computer-readable medium further comprises wherein the analyzing step comprises predicting an expected response of the at least one of the players to one or more events associated with the third action state wherein the expected response relates to one or more of a contextual, emotional, or vociferating behavior that corresponds to the player state of the at least one of the players, the method further comprising: dynamically updating the predicted expected response based, at least in part, on at least one of the detecting and analyzing steps.

In an embodiment, a method or computer-readable medium further comprises wherein the capturing step is performed asynchronously in relation to at least one of: the other players; the situations of the other players with respect to the at least one game event that occurs in association with the first action state; the situations of at least one of the players with respect to at least a second game event that occurs in association with the first action state; or the situations of at least one of the players with respect to at least a second action state; wherein the second game event is independent, at least temporally, with respect to the first game event; and wherein the second action state is independent, at least temporally, with respect to the first action state.

In an embodiment, a method or computer-readable medium further comprises wherein, upon occurrence of a game event with local significance to a particular local player, the method further comprises at least one of: upon the predicted player state of the local player being such that the local player is expected to utter a vociferation, performing the capturing step; or upon the predicted state of another player being such that the other player is expected to utter a vociferation, querying a local repository of audio content for a stored vociferation appropriate to the player state of the other player; retrieving the locally stored vociferation; and rendering the retrieved vociferation locally with respect to the particular local player.

In an embodiment, an apparatus comprises at least one processor; and a computer readable storage medium that stores instructions which, when executed, cause the at least one processor to perform steps that include: in a game wherein a plurality of players of the game are communicatively coupled with a network, tracking a progression of one or more action states of the game wherein the one or more action states relate to one or more events that occur during the game and a situation of each of the players that corresponds to the one or more events; upon reaching a first action state wherein at least one of the players is expected, based on the situation of the at least one player with respect to at least one game event that occurs in association with the first action state, to utter a first vociferation based on the first action state, detecting whether the first vociferation is uttered; and capturing the first vociferation.

In an embodiment, an apparatus further comprises wherein the instructions, when executed, further cause the at least one processor to perform steps that include: upon capturing the first vociferation, uniquely associating the vociferation with the at least one of the players from whom the first vociferation was uttered; characterizing a first player state that corresponds to the first vociferation; and classifying the first vociferation based on the characterized first player state and the at least one of the players with whom the first vociferation is associated.

In an embodiment, an apparatus further comprises wherein the instructions, when executed, further cause the at least one processor to perform steps that include: at least one of storing or commencing transmission of the classified first vociferation; and continuing the tracking the action states step.

In an embodiment, an apparatus further comprises wherein the instructions, when executed, further cause the at least one processor to perform steps that include: upon reaching a second action state wherein the at least one of the players is expected, based on the situation of the at least one player with respect to at least one game event that occurs in association with the second action state, to assume a player state that is at least similar to the first player state, retrieving the stored first vociferation that is uniquely associated with the at least one of the players and classified based on the characterized first player state thereof; and transmitting at least one of the retrieved first vociferation, or a previously transmitted reference thereto, to other players wherein the first vociferation is rendered locally with respect to the other players.

In an embodiment, an apparatus further comprises wherein: the plurality of players of the game are communicatively coupled with a network in at least one of a real time, a near real time, or an other than real time condition; and the at least one processor is caused by the instructions to perform the transmitting step, at least in part, asynchronously with respect to the capturing step.

In an embodiment, an apparatus further comprises wherein the instructions, when executed, further cause the at least one processor to perform steps that include at least one of: upon the predicted player state of the local player being such that the local player is expected to utter a vociferation, performing the capturing step; or upon the predicted state of another player being such that the other player is expected to utter a vociferation, querying a local repository of audio content for a stored vociferation appropriate to the player state of the other player; retrieving the locally stored vociferation; and rendering the retrieved vociferation locally with respect to the particular local player.

In an embodiment, an apparatus further comprises wherein the instructions, when executed, further cause the at least one processor to perform steps that include: analyzing a first representational quality, which corresponds to the first vociferation in relation to the first player state; wherein one or more of the characterizing and classifying steps, which the instructions cause the at least one processor to perform, are based, at least in part, on the analyzing step.

In an embodiment, an apparatus further comprises wherein the instructions, when executed, further cause the at least one processor to perform steps that include: upon reaching a third action state wherein the at least one of the players is expected, based on the situation of the at least one player with respect to at least one game event that occurs in association with the third action state, to assume a player state that is at least similar to the first player state, retrieving the stored first vociferation; transmitting the retrieved first vociferation to the other players wherein the first vociferation is rendered locally with respect to the other players; further upon reaching the third action state, detecting whether the at least one of the players utters a second vociferation based on the third action state; upon detecting that the at least one of the players utters a second vociferation based on the third action state, capturing the second vociferation; analyzing a second representational quality, which corresponds to the second vociferation in relation to the first player state; repeating at least one of the characterizing and classifying steps based, at least in part, on the analyzing the second representational quality step; comparing the first and the second representational qualities in relation to the first player state based, at least in part, on the repeating at least one of the characterizing and classifying steps; and based on the comparing step, selecting either the first vociferation or the second vociferation.

In an embodiment, an apparatus further comprises wherein the instructions, when executed, further cause the at least one processor to perform steps that include: upon selecting the second vociferation: storing the classified second vociferation; upon storing the second vociferation and upon reaching a fourth action state wherein the at least one of the players is expected, based on the situation of the at least one player with respect to at least one game event that occurs in association with the fourth action state, to assume a player state that is at least similar to the first player state and wherein the fourth action state is temporally subsequent to at least the third action state with respect to the game, retrieving the stored second vociferation; and transmitting the retrieved second vociferation to the other players wherein the second vociferation is rendered locally with respect to the other players; and upon selecting the first vociferation: upon reaching the fourth action state, retrieving the stored first vociferation; and transmitting the retrieved first vociferation to the other players wherein the first vociferation is rendered locally with respect to the other players.

In an embodiment, an apparatus further comprises wherein the analyzing step, which the instructions, when executed, cause the at least one processor to perform, comprises predicting an expected response of the at least one of the players to one or more events associated with the third action state wherein the expected response relates to one or more of a contextual, emotional, or vociferating behavior that corresponds to the player state of the at least one of the players and wherein the instructions further cause the at least one processor to perform a step that includes: dynamically updating the predicted expected response based, at least in part, on at least one of the detecting and analyzing steps, which the instructions, when executed, cause the at least one processor to perform.

In an embodiment, an apparatus further comprises wherein the stored instructions, when executed, cause the processor to perform the capturing step asynchronously in relation to at least one of: the other players; the situations of the other players with respect to the at least one game event that occurs in association with the first action state; the situations of at least one of the players with respect to at least a second game event that occurs in association with the first action state; or the situations of at least one of the players with respect to at least a second action state; wherein the second game event is independent, at least temporally, with respect to the first game event; and wherein the second action state is independent, at least temporally, with respect to the first action state.

In an embodiment, a system comprises means, in a game wherein a plurality of players of the game are communicatively coupled with a network, for tracking a progression of one or more action states of the game wherein the one or more action states relate to one or more events that occur during the game and a situation of each of the players that corresponds to the one or more events; means, upon reaching a first action state wherein at least one of the players is expected, based on the situation of the at least one player with respect to at least one game event that occurs in association with the first action state, to utter a first vociferation based on the first action state, for detecting whether the first vociferation is uttered; and means for capturing the first vociferation.

In an embodiment, a system further comprises means, upon capturing the vociferation, for uniquely associating the vociferation with the at least one of the players from whom the first vociferation was uttered; means for characterizing a first player state that corresponds to the first vociferation; and means for classifying the first vociferation based on the characterized first player state and the at least one of the players with whom the first vociferation is associated.

In an embodiment, a system further comprises at least one of means for storing, or means for commencing transmission of, the classified first vociferation; and means for continuing the tracking the game action means.

In an embodiment, a system further comprises means, upon reaching a second action state wherein the at least one of the players is expected, based on the situation of the at least one player with respect to at least one game event that occurs in association with the second action state, to assume a player state that is at least similar to the first player state, for retrieving the stored first vociferation that is uniquely associated with the at least one of the players and classified based on the characterized first player state thereof; and means for transmitting at least one of the retrieved first vociferation, or a previously transmitted reference thereto, to other players wherein the first vociferation is rendered locally with respect to the other players.

In an embodiment, a system further comprises wherein: the plurality of players of the game are communicatively coupled with a network in at least one of a real time, a near real time, or an other than real time condition; and a function of the transmitting means is performed, at least in part, asynchronously with respect to a function of the capturing means.

In an embodiment, a system further comprises means for analyzing a first representational quality, which corresponds to the first vociferation in relation to the first player state; wherein one or more of the characterizing and classifying means function, at least in part, on the basis of a function of the analyzing means.

In an embodiment, a system further comprises means, upon reaching a third action state wherein the at least one of the players is expected, based on the situation of the at least one player with respect to at least one game event that occurs in association with the third action state, to assume a player state that is at least similar to the first player state, for retrieving the stored first vociferation; means for transmitting the retrieved first vociferation to the other players wherein the first vociferation is rendered locally with respect to the other players; means for detecting, further upon reaching the third action state, whether the at least one of the players utters a second vociferation based on the third action state; means for capturing, upon detecting that the at least one of the players utters a second vociferation based on the third action state, the second vociferation; means for analyzing a second representational quality, which corresponds to the second vociferation in relation to the first player state; means for repeating at least one function of at least one of the characterizing and classifying means based, at least in part, on a function of the means for analyzing the second representational quality; means for comparing the first and the second representational qualities in relation to the first player state based, at least in part, on a function of the means for repeating at least one function of the characterizing and classifying means; and means for selecting, based on a function of the comparing means, either the first vociferation or the second vociferation.

In an embodiment, a system further comprises means for, upon selecting the second vociferation: storing the classified second vociferation; upon storing the second vociferation and upon reaching a fourth action state wherein the at least one of the players is expected, based on the situation of the at least one player with respect to at least one game event that occurs in association with the fourth action state, to assume a player state that is at least similar to the first player state and wherein the fourth action state is temporally subsequent to at least the third action state with respect to the game, retrieving the stored second vociferation; and transmitting the retrieved second vociferation to the other players wherein the second vociferation is rendered locally with respect to the other players; and means for, upon selecting the first vociferation: upon reaching the fourth action state, retrieving the stored first vociferation; and transmitting the retrieved first vociferation to the other players wherein the first vociferation is rendered locally with respect to the other players.

In an embodiment, a system further comprises wherein the analyzing means comprises means for predicting an expected response of the at least one of the players to one or more events associated with the third action state wherein the expected response relates to one or more of a contextual, emotional, or vociferating behavior that corresponds to the player state of the at least one of the players, the system further comprising: means for dynamically updating the predicted expected response based, at least in part, on a function of at least one of the detecting and analyzing means.

In an embodiment, a system further comprises wherein the capturing means perform a function asynchronously in relation to at least one of: the other players; the situations of the other players with respect to the at least one game event that occurs in association with the first action state; the situations of at least one of the players with respect to at least a second game event that occurs in association with the first action state; or the situations of at least one of the players with respect to at least a second action state; wherein the second game event is independent, at least temporally, with respect to the first game event; and wherein the second action state is independent, at least temporally, with respect to the first action state.

In an embodiment, a system further comprises at least one of: means for, upon the predicted player state of the local player being such that the local player is expected to utter a vociferation, performing the capturing step; or means for, upon the predicted state of another player being such that the other player is expected to utter a vociferation, querying a local repository of audio content for a stored vociferation appropriate to the player state of the other player; retrieving the locally stored vociferation; and rendering the retrieved vociferation locally with respect to the particular local player.

In an embodiment, a device comprises at least one processor; and a computer readable storage medium that stores instructions which, when executed, cause the at least one processor to perform at least one of: configure a game application; or control at least one other component of the device to configure a game application; wherein the game application functions to operate a game wherein a plurality of players of the game are communicatively coupled with a network; and wherein the game application includes: at least one game action component that controls and tracks a progression of one or more action states of the game wherein the one or more action states relate to one or more events that occur during the game and a situation of each of the players that corresponds to the one or more events; one or more vociferation components that, upon reaching a first action state wherein at least one of the players is expected, based on the situation of the at least one player with respect to at least one game event that occurs in association with the first action state, to utter a first vociferation based on the first action state: detect whether the first vociferation is uttered; and capture the first vociferation.

In an embodiment, a device further comprises wherein the one or more vociferation components: upon capturing the first vociferation, uniquely associates the first vociferation with the at least one of the players from whom the first vociferation was uttered; characterize a first player state that corresponds to the first vociferation; and classify the first vociferation based on the characterized first player state and the at least one of the players with whom the first vociferation is associated.

In an embodiment, a device further comprises wherein the game application further includes a component for at least one of storing or commencing transmission of the classified first vociferation; wherein the at least one game action component of the game application continues tracking the action states as the game progresses with respect to at least one of time or game action.

In an embodiment, a device further comprises wherein the game application further includes: a component that, upon reaching a second action state wherein the at least one of the players is expected, based on the situation of the at least one player with respect to at least one game event that occurs in association with the second action state, to assume a player state that is at least similar to the first player state, retrieves the stored first vociferation that is uniquely associated with the at least one of the players and classified based on the characterized first player state thereof; and wherein the transmitting component resends at least one of the retrieved first vociferation, or a previously transmitted reference thereto, to other players wherein the first vociferation is rendered locally with respect to the other players.

In an embodiment, a device further comprises wherein: the plurality of players of the game are communicatively coupled with a network in at least one of a real time, a near real time, or an other than real time condition; and the transmitting component of the game application functions, at least in part, asynchronously with respect to the capturing component of the game application.

In an embodiment, a device further comprises wherein the one or more vociferation components comprise: a component that analyzes a first representational quality, which corresponds to the first vociferation in relation to the first player state; wherein the one or more vociferation components characterize and classify the first vociferation based, at least in part, on a function of the analyzing component.

In an embodiment, a device further comprises wherein: upon reaching a third action state wherein the at least one of the players is expected, based on the situation of the at least one player with respect to at least one game event that occurs in association with the third action state, to assume a player state that is at least similar to the first player state, the gaming application: retrieves the stored first vociferation; transmits the retrieved first vociferation to the other players wherein the first vociferation is rendered locally with respect to the other players; further upon reaching the third action state, one or more vociferation components: detects whether the at least one of the players utters a second vociferation based on the third action state; upon detecting that the at least one of the players utters a second vociferation based on the third action state, captures the second vociferation; analyzes a second representational quality, which corresponds to the second vociferation in relation to the first player state; repeats at least one function to characterize or classify the second vociferation based, at least in part, on the analysis of the second representational quality; compares the first and the second representational qualities in relation to the first player state based, at least in part, on at least one of the repeated characterization or classification; and based on the comparison, selects either the first vociferation or the second vociferation.

In an embodiment, a device further comprises wherein the game application: upon a selection of the second vociferation: stores the classified second vociferation; upon storing the second vociferation and upon reaching a fourth action state wherein the at least one of the players is expected, based on the situation of the at least one player with respect to at least one game event that occurs in association with the fourth action state, to assume a player state that is at least similar to the first player state and wherein the fourth action state is temporally subsequent to at least the third action state with respect to the game, retrieves the stored second vociferation; and transmits the retrieved second vociferation to the other players wherein the second vociferation is rendered locally with respect to the other players; and upon a selection of the first vociferation: upon reaching the fourth action state, retrieves the stored first vociferation; and transmits the retrieved first vociferation to the other players wherein the first vociferation is rendered locally with respect to the other players.

In an embodiment, a device further comprises wherein the analysis performed by the game application includes a prediction related to an expected response of the at least one of the players to one or more events associated with the third action state wherein the expected response relates to one or more of a contextual, emotional, or vociferating behavior that corresponds to the player state of the at least one of the players, wherein the game action component further: dynamically updates the predicted expected response based, at least in part, on at least one of the detection and analysis of the first vociferation and one or more vociferations that are subsequent to the first vociferation.

In an embodiment, a device further comprises wherein the one or more vociferation components capture a vociferation asynchronously in relation to at least one of: the other players; the situations of the other players with respect to the at least one game event that occurs in association with the first action state; the situations of at least one of the players with respect to at least a second game event that occurs in association with the first action state; or the situations of at least one of the players with respect to at least a second action state; wherein the second game event is independent, at least temporally, with respect to the first game event; and wherein the second action state is independent, at least temporally, with respect to the first action state.

In an embodiment, a device further comprises at least one of: a component that, upon the predicted player state of the local player being such that the local player is expected to utter a vociferation, performs the capturing step; or a component that, upon the predicted state of another player being such that the other player is expected to utter a vociferation: queries a local repository of audio content for a stored vociferation appropriate to the player state of the other player; retrieves the locally stored vociferation; and renders the retrieved vociferation locally with respect to the particular local player.

Equivalents, Extensions, Alternatives and Miscellaneous

Example embodiments that relate to asynchronous audio for network based games are thus described. In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising the steps of:
   tracking a progression of one or more action states of a game, wherein a plurality of players of the game are communicatively coupled with a network via computing devices, and wherein the one or more action states relate to one or more events that occur during the game and a situation of each of the players that corresponds to the one or more events;
   detecting whether a first vociferation is uttered upon reaching a first action state wherein at least one of the players is expected, based on the situation of the at least one player with respect to at least one game event that occurs in association with the first action state, to utter the first vociferation based on the first action state;

capturing the first vociferation;

upon capturing the first vociferation, uniquely associating the first vociferation with the at least one of the players from whom the first vociferation was uttered;

characterizing a first player emotional state that corresponds to the first vociferation;

associating a classification with the first vociferation based on the characterized first player emotional state and the at least one of the players with whom the first vociferation is associated; and storing the captured first vociferation along with the associated classification;

wherein the method is performed by one or more computing devices.

2. The method as recited in claim 1, further comprising the step of:

performing at least one of storing or commencing transmission of the classified first vociferation.

3. The method as recited in claim 2, further comprising the steps of:

retrieving the stored first vociferation that is uniquely associated with the at least one of the players and classified based on the characterized first player emotional state, upon reaching a second action state wherein the at least one of the players is expected, based on the situation of the at least one player with respect to at least one game event that occurs in association with the second action state, to assume a player emotional state that is at least similar to the first player emotional state; and at least one of transmitting the retrieved first vociferation, or a previously transmitted reference thereto, to other players wherein the first vociferation is rendered locally with respect to the other players.

4. The method as recited in claim 3 wherein:

the plurality of players of the game are communicatively coupled with a network via computing devices in at least one of a real time, a near real time, or an other than real time condition; and the transmitting step is performed, at least in part, asynchronously with respect to the capturing step.

5. The method as recited in claim 2, further comprising the step of:

analyzing a first representational quality, which corresponds to the first vociferation in relation to the first player emotional state;

wherein one or more of the characterizing and classifying steps are based, at least in part, on the analyzing step.

6. The method as recited in claim 5, further comprising the steps of:

retrieving the stored first vociferation upon reaching a third action state wherein the at least one of the players is expected, based on the situation of the at least one player with respect to at least one game event that occurs in association with the third action state, to assume a player emotional state that is at least similar to the first player emotional state;

transmitting the retrieved first vociferation to the other players wherein the first vociferation is rendered locally with respect to the other players;

further upon reaching the third action state, detecting whether the at least one of the players utters a second vociferation based on the third action state;

upon detecting that the at least one of the players utters a second vociferation based on the third action state, capturing the second vociferation;

analyzing a second representational quality, which corresponds to the second vociferation in relation to the first player emotional state;

repeating at least one of the characterizing and classifying steps based, at least in part, on the analyzing the second representational quality step;

comparing the first and the second representational qualities in relation to the first player emotional state based, at least in part, on the repeating at least one of the characterizing and classifying steps; and based on the comparing step, selecting either the first vociferation or the second vociferation.

7. The method as recited in claim 6, further comprising the steps of:

upon selecting the second vociferation:

storing the classified second vociferation;

retrieving the stored second vociferation upon storing the second vociferation and upon reaching a fourth action state wherein the at least one of the players is expected, based on the situation of the at least one player with respect to at least one game event that occurs in association with the fourth action state, to assume a player emotional state that is at least similar to the first player emotional state and wherein the fourth action state is temporally subsequent to at least the third action state with respect to the game; and transmitting the retrieved second vociferation to the other players wherein the second vociferation is rendered locally with respect to the other players; and upon selecting the first vociferation:

upon reaching the fourth action state, retrieving the stored first vociferation; and transmitting the retrieved first vociferation to the other players wherein the first vociferation is rendered locally with respect to the other players.

8. The method as recited in claim 6 wherein the analyzing step comprises predicting an expected response of the at least one of the players to one or more events associated with the third action state wherein the expected response relates to one or more of a contextual, emotional, or vociferating behavior that corresponds to the player emotional state of the at least one of the players, the method further comprising:

dynamically updating the predicted expected response based, at least in part, on at least one of the detecting and analyzing steps.

9. The method as recited in claim 1 wherein the capturing step is performed asynchronously in relation to at least one of:

the other players;

the situations of the other players with respect to the at least one game event that occurs in association with the first action state;

the situations of at least one of the players with respect to at least a second game event that occurs in association with the first action state; or the situations of at least one of the players with respect to at least a second action state;

wherein the second game event is independent, at least temporally, with respect to the first game event; and wherein the second action state is independent, at least temporally, with respect to the first action state.

10. The method as recited in claim 1, wherein, upon occurrence of a game event with local significance to a particular local player, the method further comprises at least one of:

upon a predicted player emotional state of the local player being such that the local player is expected to utter a vociferation, performing the capturing step; or upon a predicted state of another player being such that the other player is expected to utter a vociferation, querying a local repository of audio content for a stored vociferation appropriate to a player emotional state of the other player;

retrieving the locally stored vociferation; and rendering the retrieved vociferation locally with respect to the particular local player.

11. An apparatus, comprising:

at least one processor; and a computer readable storage medium that stores instructions which, when the instructions are executed by the at least one processor, cause the at least one processor to perform steps that include:

monitoring a progression of one or more action states of a game, wherein a plurality of players of the game are communicatively coupled with a network via computing devices, and wherein the one or more action states relate to one or more events that occur during the game and a situation of each of the players that corresponds to the one or more events;

detecting whether a first vociferation is uttered upon reaching a first action state wherein at least one of the players is expected, based on the situation of the at least one player with respect to at least one game event that occurs in association with the first action state, to utter the first vociferation based on the first action state;

capturing the first vociferation;

upon capturing the first vociferation, uniquely associating the first vociferation with the at least one of the players from whom the first vociferation was uttered;

characterizing a first player emotional state that corresponds to the first vociferation;

associating a classification with the first vociferation based on the characterized first player emotional state and the at least one of the players with whom the first vociferation is associated; and storing the captured first vociferation along with the associated classification.

12. The apparatus as recited in claim 11 wherein the instructions, when executed, further cause the at least one processor to perform steps that include:

performing at least one of storing or commencing transmission of the classified first vociferation.

13. The apparatus as recited in claim 12 wherein the instructions, when executed, further cause the at least one processor to perform steps that include:

retrieving the stored first vociferation that is uniquely associated with the at least one of the players and classified based on the characterized first player emotional state, upon reaching a second action state wherein the at least one of the players is expected, based on the situation of the at least one player with respect to at least one game event that occurs in association with the second action state, to assume a player emotional state that is at least similar to the first player emotional state; and transmitting at least one of the retrieved first vociferation, or a previously transmitted reference to the retrieved first vociferation, to other players wherein the first vociferation is rendered locally with respect to the other players.

14. The apparatus as recited in claim 13 wherein:

the plurality of players of the game are communicatively coupled with a network via computing devices in at least one of a real time, a near real time, or an other than real time condition; and the at least one processor is caused by the instructions to perform the transmitting step, at least in part, asynchronously with respect to the capturing step.

15. The apparatus as recited in claim 12 wherein the instructions, when executed, further cause the at least one processor to perform steps that include:

analyzing a first representational quality, which corresponds to the first vociferation in relation to the first player emotional state;

wherein one or more of the characterizing and classifying steps, which the instructions cause the at least one processor to perform, are based, at least in part, on the analyzing step.

16. The apparatus as recited in claim 15 wherein the instructions, when executed, further cause the at least one processor to perform steps that include:

retrieving the stored first vociferation upon reaching a third action state wherein the at least one of the players is expected, based on the situation of the at least one player with respect to at least one game event that occurs in association with the third action state, to assume a player emotional state that is at least similar to the first player emotional state;

transmitting the retrieved first vociferation to the computing devices of the other players wherein the first vociferation is rendered locally with respect to the other players;

further upon reaching the third action state, detecting whether the at least one of the players utters a second vociferation based on the third action state;

upon detecting that the at least one of the players utters a second vociferation based on the third action state, capturing the second vociferation;

analyzing a second representational quality, which corresponds to the second vociferation in relation to the first player emotional state;

repeating at least one of the characterizing and classifying steps based, at least in part, on the analyzing the second representational quality step;

comparing the first and the second representational qualities in relation to the first player emotional state based, at least in part, on the repeating at least one of the characterizing and classifying steps; and based on the comparing step, selecting either the first vociferation or the second vociferation.

17. The apparatus as recited in claim 16 wherein the instructions, when executed, further cause the at least one processor to perform steps that include:

upon selecting the second vociferation:

storing the classified second vociferation;

retrieving the stored second vociferation upon storing the second vociferation and upon reaching a fourth action state wherein the at least one of the players is expected, based on the situation of the at least one player with respect to at least one game event that occurs in association with the fourth action state, to assume a player emotional state that is at least similar to the first player emotional state and wherein the fourth action state is temporally subsequent to at least the third action state with respect to the game; and transmitting the retrieved second vociferation to the other players wherein the second vociferation is rendered locally with respect to the other players; and upon selecting the first vociferation:

retrieving the stored first vociferation upon reaching the fourth action state; and transmitting the retrieved first vociferation to the other players wherein the first vociferation is rendered locally with respect to the other players.

18. The apparatus as recited in claim 16 wherein the analyzing step, which the instructions, when executed, cause the at least one processor to perform, comprises predicting an expected response of the at least one of the players to one or more events associated with the third action state wherein the expected response relates to one or more of a contextual, emotional, or vociferating behavior that corresponds to the player emotional state of the at least one of the players and wherein the instructions further cause the at least one processor to perform a step that includes:

dynamically updating the predicted expected response based, at least in part, on at least one of the detecting and analyzing steps, which the instructions, when executed, cause the at least one processor to perform.

19. The apparatus as recited in claim 11 wherein the stored instructions, when executed, cause the processor to perform the capturing step asynchronously in relation to at least one of:

the other players;
the situations of the other players with respect to the at least one game event that occurs in association with the first action state;
the situations of at least one of the players with respect to at least a second game event that occurs in association with the first action state; or
the situations of at least one of the players with respect to at least a second action state;
wherein the second game event is independent, at least temporally, with respect to the first game event; and
wherein the second action state is independent, at least temporally, with respect to the first action state.

20. The apparatus as recited in claim 11 wherein the instructions, when executed, further cause the at least one processor to perform steps that include at least one of:

upon a predicted player emotional state of the local player being such that the local player is expected to utter a vociferation, performing the capturing step; or
upon a predicted state of another player being such that the other player is expected to utter a vociferation, querying a local repository of audio content for a stored vociferation appropriate to a player emotional state of the other player;
retrieving the locally stored vociferation; and
rendering the retrieved vociferation locally with respect to the particular local player.

21. A system, comprising:
means for monitoring a progression of one or more action states of a game, wherein a plurality of players of the game are communicatively coupled with a network via computing devices, wherein the one or more action states relate to one or more events that occur during the game and a situation of each of the players that corresponds to the one or more events;
means for detecting whether a first vociferation is uttered upon reaching a first action state wherein at least one of the players is expected, based on the situation of the at least one player with respect to at least one game event that occurs in association with the first action state, to utter the first vociferation based on the first action state, for detecting whether the first vociferation is uttered;
means for capturing the first vociferation;
means, upon capturing the vociferation, for uniquely associating the vociferation with the at least one of the players from whom the first vociferation was uttered;
means for characterizing a first player emotional state that corresponds to the first vociferation; and
means for associating a classification with the first vociferation based on the characterized first player emotional state and the at least one of the players with whom the first vociferation is associated; and
means for storing the captured first vociferation along with the associated classification.

22. The system as recited in claim 21, further comprising:
at least one of means for storing, or means for commencing transmission of, the classified first vociferation.

23. The system as recited in claim 22, further comprising:
means for retrieving the stored first vociferation that is uniquely associated with the at least one of the players and classified based on the characterized first player emotional state upon reaching a second action state wherein the at least one of the players is expected, based on the situation of the at least one player with respect to at least one game event that occurs in association with the second action state, to assume a player emotional state that is at least similar to the first player emotional state; and
means for transmitting at least one of the retrieved first vociferation, or a previously transmitted reference to the retrieved first vociferation, to other players wherein the first vociferation is rendered locally with respect to the other players.

24. The system as recited in claim 23 wherein:
the plurality of players of the game are communicatively coupled with a network via computing devices in at least one of a real time, a near real time, or an other than real time condition; and
a function of the transmitting means is performed, at least in part, asynchronously with respect to a function of the capturing means.

25. The system as recited in claim 22, further comprising:
means for analyzing a first representational quality, which corresponds to the first vociferation in relation to the first player emotional state;
wherein one or more of the characterizing and classifying means function, at least in part, on the basis of a function of the analyzing means.

26. The system as recited in claim 25, further comprising:
means for retrieving the stored first vociferation upon reaching a third action state wherein the at least one of the players is expected, based on the situation of the at least one player with respect to at least one game event that occurs in association with the third action state, to assume a player emotional state that is at least similar to the first player emotional state;
means for transmitting the retrieved first vociferation to the computing devices of the other players wherein the first vociferation is rendered locally with respect to the other players;
means for detecting, further upon reaching the third action state, whether the at least one of the players utters a second vociferation based on the third action state;
means for capturing, upon detecting that the at least one of the players utters a second vociferation based on the third action state, the second vociferation;
means for analyzing a second representational quality, which corresponds to the second vociferation in relation to the first player emotional state;
means for repeating at least one function of at least one of the characterizing and classifying means based, at least in part, on a function of the means for analyzing the second representational quality;

means for comparing the first and the second representational qualities in relation to the first player emotional state based, at least in part, on a function of the means for repeating at least one function of the characterizing and classifying means; and
means for selecting, based on a function of the comparing means, either the first vociferation or the second vociferation.

27. The system as recited in claim 26, further comprising: means for, upon selecting the second vociferation:
storing the classified second vociferation;
retrieving the stored second vociferation upon storing the second vociferation and upon reaching a fourth action state wherein the at least one of the players is expected, based on the situation of the least one player with respect to at least one game event that occurs in association with the fourth action state, to assume a player emotional state that is at least similar to the first player emotional state and wherein the fourth action state is temporally subsequent to at least the third action state with respect to the game; and
transmitting the retrieved second vociferation to the other players wherein the second vociferation is rendered locally with respect to the other players; and
means for, upon selecting the first vociferation:
retrieving the stored first vociferation upon reaching the fourth action state; and
transmitting the retrieved first vociferation to the other players wherein the first vociferation is rendered locally with respect to the other players.

28. The system as recited in claim 26 wherein the analyzing means comprises means for predicting an expected response of the at least one of the players to one or more events associated with the third action state wherein the expected response relates to one or more of a contextual, emotional, or vociferating behavior that corresponds to the player emotional state of the at least one of the players, the system further comprising:
means for dynamically updating the predicted expected response based, at least in part, on a function of at least one of the detecting and analyzing means.

29. The system as recited in claim 21 wherein the capturing means perform a function asynchronously in relation to at least one of:
the other players;
the situations of the other players with respect to the at least one game event that occurs in association with the first action state;
the situations of at least one of the players with respect to at least a second game event that occurs in association with the first action state; or
the situations of at least one of the players with respect to at least a second action state;
wherein the second game event is independent, at least temporally, with respect to the first game event; and
wherein the second action state is independent, at least temporally, with respect to the first action state.

30. The system as recited in claim 21, further comprising at least one of:
means for, upon a predicted player emotional state of the local player being such that the
local player is expected to utter a vociferation, performing the capturing step; or
means for, upon a predicted state of another player being such that the other player is expected to utter a vociferation, querying a local repository of audio content for a stored vociferation appropriate to a player emotional state of the other player;
retrieving the locally stored vociferation; and
rendering the retrieved vociferation locally with respect to the particular local player.

31. A non-transitory computer readable storage medium storing encoded instructions which, when executed by one or more processors, cause the one or more processors to perform the steps of:
monitoring a progression of one or more action states of a game, wherein a plurality of players of the game are communicatively coupled with a network via computing devices, and wherein the one or more action states relate to one or more events that occur during the game and a situation of each of the players that corresponds to the one or more events;
detecting whether a first vociferation is uttered upon reaching a first action state wherein at least one of the players is expected, based on the situation of the at least one player with respect to at least one game event that occurs in association with the first action state, to utter the first vociferation based on the first action state;
capturing the first vociferation;
upon capturing the first vociferation, uniquely associating, by the computing device, the first vociferation with the at least one of the players from whom the first vociferation was uttered;
characterizing a first player emotional state that corresponds to the first vociferation;
associating a classification with the first vociferation based on the characterized first player emotional state and the at least one of the players with whom the first vociferation is associated; and
storing the captured first vociferation along with the associated classification.

32. The non-transitory computer readable storage medium as recited in claim 31 wherein the encoded instructions, when executed by the one or more processors, further cause the one or more processors to perform the steps of:
performing at least one of: storing or commencing transmission of the classified first vociferation.

33. The non-transitory computer readable storage medium as recited in claim 32 wherein the encoded instructions, when executed by the one or more processors, further cause the one or more processors to perform the steps of:
retrieving the stored first vociferation that is uniquely associated with the at least one of the players and classified based on the characterized first player emotional state, upon reaching a second action state wherein the at least one of the players is expected, based on the situation of the at least one player with respect to at least one game event that occurs in association with the second action state, to assume a player emotional state that is at least similar to the first player emotional state; and
performing at least one of: transmitting the retrieved first vociferation, or a previously transmitted reference to the retrieved first vociferation, to other players wherein the first vociferation is rendered locally with respect to the other players.

34. The non-transitory computer readable storage medium as recited in claim 33 wherein the encoded instructions, when executed by the one or more processors, further cause the one or more processors to perform the steps of:

the plurality of players of the game are communicatively coupled with a network via computing devices in at least one of a real time, a near real time, or an other than real time condition; and the transmitting step is performed, at least in part, asynchronously with respect to the capturing step.

35. The non-transitory computer readable storage medium as recited in claim 32 wherein the encoded instructions, when executed by the one or more processors, further cause the one or more processors to perform the steps of:

analyzing a first representational quality, which corresponds to the first vociferation in relation to the first player emotional state;

wherein one or more of the characterizing and classifying steps are based, at least in part, on the analyzing step.

36. The non-transitory computer readable storage medium as recited in claim 35 wherein the encoded instructions, when executed by the one or more processors, further cause the one or more processors to perform the steps of:

retrieving the stored first vociferation upon reaching a third action state wherein the at least one of the players is expected, based on the situation of the at least one player with respect to at least one game event that occurs in association with the third action state, to assume a player emotional state that is at least similar to the first player emotional state;

transmitting the retrieved first vociferation to the computing devices of the other players wherein the first vociferation is rendered locally with respect to the other players;

further upon reaching the third action state, detecting whether the at least one of the players utters a second vociferation based on the third action state;

upon detecting that the at least one of the players utters a second vociferation based on the third action state, capturing the second vociferation;

analyzing a second representational quality, which corresponds to the second vociferation in relation to the first player emotional state;

repeating at least one of the characterizing and classifying steps based, at least in part, on the analyzing the second representational quality step;

comparing the first and the second representational qualities in relation to the first player emotional state based, at least in part, on the repeating at least one of the characterizing and classifying steps; and based on the comparing step, selecting either the first vociferation or the second vociferation.

37. The non-transitory computer readable storage medium as recited in claim 36 wherein the encoded instructions, when executed by the one or more processors, further cause the one or more processors to perform the steps of:

upon selecting the second vociferation:
storing the classified second vociferation;
retrieving the stored second vociferation upon storing the second vociferation and upon reaching a fourth action state wherein the at least one of the players is expected, based on the situation of the at least one player with respect to at least one game event that occurs in association with the fourth action state, to assume a player emotional state that is at least similar to the first player emotional state and wherein the fourth action state is temporally subsequent to at least the third action state with respect to the game; and
transmitting the retrieved second vociferation to the other players wherein the second vociferation is rendered locally with respect to the other players; and upon selecting the first vociferation:

retrieving the stored first vociferation upon reaching the fourth action state; and
transmitting the retrieved first vociferation to the other players wherein the first vociferation is rendered locally with respect to the other players.

38. The non-transitory computer readable storage medium as recited in claim 36 wherein the analyzing step, which the encoded instructions, when executed, cause the one or more processors to perform, comprises predicting an expected response of the at least one of the players to one or more events associated with the third action state wherein the expected response relates to one or more of a contextual, emotional, or vociferating behavior that corresponds to the player emotional state of the at least one of the players, the encoded instructions, when executed, further cause the one or more processors to perform:

dynamically updating the predicted expected response based, at least in part, on at least one of the detecting and analyzing steps.

39. The non-transitory computer readable storage medium as recited in claim 31 wherein the encoded instructions, when executed by the one or more processors, further cause the one or more processors to perform the capturing step asynchronously in relation to at least one of:

the other players;
the situations of the other players with respect to the at least one game event that occurs in association with the first action state;
the situations of at least one of the players with respect to at least a second game event that occurs in association with the first action state; or
the situations of at least one of the players with respect to at least a second action state;
wherein the second game event is independent, at least temporally, with respect to the first game event; and
wherein the second action state is independent, at least temporally, with respect to the first action state.

40. The non-transitory computer readable storage medium as recited in claim 31 wherein the encoded instructions, when executed by the one or more processors, further cause the one or more processors to perform the steps of at least one of:

upon a predicted player emotional state of the local player being such that the local player is expected to utter a vociferation, performing the capturing step; or
upon a predicted state of another player being such that the other player is expected to utter a vociferation, querying a local repository of audio content for a stored vociferation appropriate to a player emotional state of the other player;
retrieving the locally stored vociferation; and
rendering the retrieved vociferation locally with respect to the particular local player.

41. A device, comprising:
at least one processor; and
a computer readable storage medium that stores instructions which, when the instructions are executed by the at least one processor, cause the at least one processor to perform at least one of:
configure an environment of a game application; or
control at least one other component of the device to configure an environment of a game application;
wherein the game application functions to operate a game wherein a plurality of players of the game are communicatively coupled with a network via computing devices; and
wherein the game application includes:

at least one game action component that controls and monitors a progression of one or more action states of the game wherein the one or more action states relate to one or more events that occur during the game and a situation of each of the players that corresponds to the one or more events;

one or more vociferation components that, upon reaching a first action state wherein at least one of the players is expected, based on the situation of the at least one player with respect to at least one game event that occurs in association with the first action state, to utter a first vociferation based on the first action state:

detect whether the first vociferation is uttered;

capture the first vociferation.

upon capturing the first vociferation, uniquely associates the first vociferation with the at least one of the players from whom the first vociferation was uttered;

characterize a first player emotional state that corresponds to the first vociferation; and associate a classification with the first vociferation based on the characterized first player emotional state and the at least one of the players with whom the first vociferation is associated; and store the captured first vociferation along with the associated classification.

42. The device as recited in claim 41 wherein the game application further includes a component for performing at least one of storing or commencing transmission of the classified first vociferation.

43. The device as recited in claim 42 wherein the game application further includes:

a component that, retrieves the stored first vociferation that is uniquely associated with the at least one of the players and classified based on the characterized first player emotional state, upon reaching a second action state wherein the at least one of the players is expected, based on the situation of the at least one player with respect to at least one game event that occurs in association with the second action state, to assume a player emotional state that is at least similar to the first player emotional state; and wherein the transmitting component resends at least one of the retrieved first vociferation, or a previously transmitted reference to the retrieved first vociferation, to other players wherein the first vociferation is rendered locally with respect to the other players.

44. The device as recited in claim 43 wherein:

the plurality of players of the game are communicatively coupled with a network via computing devices in at least one of a real time, a near real time, or an other than real time condition; and the transmitting component of the game application functions, at least in part, asynchronously with respect to the capturing component of the game application.

45. The device as recited in claim 42 wherein the one or more vociferation components comprise:

a component that analyzes a first representational quality, which corresponds to the first vociferation in relation to the first player emotional state;

wherein the one or more vociferation components characterize and classify the first vociferation based, at least in part, on a function of the analyzing component.

46. The device as recited in claim 45 wherein:

upon reaching a third action state wherein the at least one of the players is expected, based on the situation of the at least one player with respect to at least one game event that occurs in association with the third action state, to assume a player emotional state that is at least similar to the first player emotional state, the gaming application:

retrieves the stored first vociferation;

transmits the retrieved first vociferation to the computing devices of the other players wherein the first vociferation is rendered locally with respect to the other players;

further upon reaching the third action state, one or more vociferation components:

detects whether the at least one of the players utters a second vociferation based on the third action state;

upon detecting that the at least one of the players utters a second vociferation based on the third action state, captures the second vociferation;

analyzes a second representational quality, which corresponds to the second vociferation in relation to the first player emotional state;

repeats at least one function to characterize or classify the second vociferation based, at least in part, on the analysis of the second representational quality;

compares the first and the second representational qualities in relation to the first player emotional state based, at least in part, on at least one of the repeated characterization or classification; and based on the comparison, selects either the first vociferation or the second vociferation.

47. The device as recited in claim 46 wherein the game application:

upon a selection of the second vociferation:

stores the classified second vociferation;

retrieves the stored second vociferation upon storing the second vociferation and upon reaching a fourth action state wherein the at least one of the players is expected, based on the situation of the at least one player with respect to at least one game event that occurs in association with the fourth action state, to assume a player emotional state that is at least similar to the first player emotional state and wherein the fourth action state is temporally subsequent to at least the third action state with respect to the game; and transmits the retrieved second vociferation to the other players wherein the second vociferation is rendered locally with respect to the other players; and upon a selection of the first vociferation:

retrieves the stored first vociferation upon reaching the fourth action state; and transmits the retrieved first vociferation to the other players wherein the first vociferation is rendered locally with respect to the other players.

48. The device as recited in claim 46 wherein the analysis performed by the game application includes a prediction related to an expected response of the at least one of the players to one or more events associated with the third action state wherein the expected response relates to one or more of a contextual, emotional, or vociferating behavior that corresponds to the player emotional state of the at least one of the players, wherein the game action component further:

dynamically updates the predicted expected response based, at least in part, on at least one of the detection and analysis of the first vociferation and one or more vociferations that are subsequent to the first vociferation.

49. The device as recited in claim 41 wherein the one or more vociferation components capture a vociferation asynchronously in relation to at least one of:

the other players;

the situations of the other players with respect to the at least one game event that occurs in association with the first action state;

the situations of at least one of the players with respect to at least a second game event that occurs in association with the first action state; or the situations of at least one of the players with respect to at least a second action state;

wherein the second game event is independent, at least temporally, with respect to the first game event; and wherein the second action state is independent, at least temporally, with respect to the first action state.

50. The device as recited in claim 41, further comprising at least one of:

a component that, upon a predicted player emotional state of the local player being such that the local player is expected to utter a vociferation, performs the capturing step; or a component that, upon a predicted state of another player being such that the other player is expected to utter a vociferation:

queries a local repository of audio content for a stored vociferation appropriate to a player emotional state of the other player;

retrieves the locally stored vociferation; and renders the retrieved vociferation locally with respect to the particular local player.

\* \* \* \* \*